(12) United States Patent
Tao et al.

(10) Patent No.: US 11,565,469 B1
(45) Date of Patent: Jan. 31, 2023

(54) MATERIAL FEEDING MECHANISM, MULTI-MATERIAL UNIT AND 3D PRINTING SYSTEM

(71) Applicant: SHANGHAI CONTOUR TECHNOLOGY CO., LTD., Shanghai (CN)

(72) Inventors: Ye Tao, Shanghai (CN); Kaiwang Tian, Shanghai (CN)

(73) Assignee: SHANGHAI CONTOUR TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/505,872

(22) Filed: Oct. 20, 2021

(30) Foreign Application Priority Data

Jun. 28, 2021 (CN) .......................... 202110717965.2

(51) Int. Cl.
*B29C 64/321* (2017.01)
*B29C 64/118* (2017.01)
*B33Y 30/00* (2015.01)

(52) U.S. Cl.
CPC .......... *B29C 64/321* (2017.08); *B29C 64/118* (2017.08); *B33Y 30/00* (2014.12)

(58) Field of Classification Search
CPC ...... B29C 64/321; B29C 64/118; B33Y 30/00
See application file for complete search history.

(56) References Cited

U.S. PATENT DOCUMENTS

| 4,461,416 | A | * | 7/1984 | Cheh | B65H 51/10 |
| | | | | | 226/190 |
| 7,395,952 | B2 | * | 7/2008 | Daniel | B65B 27/12 |
| | | | | | 226/176 |
| 2009/0174134 | A1 | | 7/2009 | Wong et al. | |
| 2018/0043628 | A1 | * | 2/2018 | Nadeau | B33Y 40/00 |
| 2018/0207869 | A1 | | 7/2018 | Lee et al. | |
| 2019/0127176 | A1 | | 5/2019 | Franklin-Hensler et al. | |

FOREIGN PATENT DOCUMENTS

| CN | 201406563 Y | 2/2010 |
| CN | 103950202 A | 7/2014 |
| CN | 205097548 U | 3/2016 |
| CN | 105946242 A | 9/2016 |
| CN | 207290958 U | 5/2018 |
| CN | 110422690 A | 11/2019 |
| KR | 101645250 B1 | 8/2016 |

* cited by examiner

*Primary Examiner* — Joseph S Del Sole
*Assistant Examiner* — Baileigh Kate Darnell
(74) *Attorney, Agent, or Firm* — Veros Legal Solutions, LLP

(57) ABSTRACT

Provided are a material feeding mechanism, a multi-material unit and a 3D printing system. The material feeding mechanism includes a main body, an unloading clutch assembly connected to the main body, and a driver assembly configured to drive the unloading clutch assembly to be switchable between a first position relative to the main body and a second position relative to the main body. In the first position, the unloading clutch assembly is drivingly coupled to a reel to rotate the reel under driving of the driver assembly to wind a wire around the reel. In the second position, the unloading clutch assembly is drivingly separated from the reel.

18 Claims, 14 Drawing Sheets

MATERIAL FEEDING MECHANISM, MULTI-MATERIAL UNIT AND 3D PRINTING SYSTEM

CROSS REFERENCE TO RELATED APPLICATIONS

This application claims priority to Chinese Patent Application No. CN202110717965. 2, filed on Jun. 28, 2021, the contents of which are hereby incorporated by reference in their entirety for all purposes.

TECHNICAL FIELD

The present disclosure relates to the technical field of 3D printing, and in particular to a material feeding mechanism, a multi-material unit and a 3D printing system.

BACKGROUND 3D printing systems are also known as three-dimensional printers, namely devices capable of implementing rapid prototyping, and the 3D printers can use bonding materials, such as special wax materials, powdered metals or plastics, to manufacture three-dimensional objects by printing layers of bonding materials. Currently, the 3D printing system comprises a 3D printer and a multi-material unit (referred to as "MMU") which can automatically switch the type or color of a wire according to printing requirements and deliver the wire to the 3D printer.

SUMMARY

Embodiments of the present disclosure provide a material feeding mechanism, a multi-material unit and a 3D printing system.

According to a first aspect of the embodiments of the present disclosure, provided is a material feeding mechanism, comprising: a main body; an unloading clutch assembly connected to the main body; and a driver assembly configured to drive the unloading clutch assembly to be switchable between (i) a first position relative to the main body in which the unloading clutch assembly is drivingly coupled to a reel to rotate the reel under driving of the driver assembly to wind a wire around the reel; and (ii) a second position relative to the main body in which the unloading clutch assembly is drivingly separated from the reel.

According to a second aspect of the embodiments of the present disclosure, provided is a multi-material unit, comprising: at least one reel around which at least one wire for a 3D printer is wound respectively; and at least one material feeding mechanism, each material feeding mechanism comprising the material feeding mechanism described above, wherein the at least one material feeding mechanism is for use with respective ones of the at least one reel to feed the at least one wire to the 3D printer.

According to a third aspect of the embodiments of the present disclosure, provided is a 3D printing system, comprising: a 3D printer; at least one reel around which at least one wire for the 3D printer is wound; and at least one material feeding mechanism, each material feeding mechanism comprising: a main body; an unloading clutch assembly connected to the main body; and a driver assembly configured to drive the unloading clutch assembly to be switchable between (i) a first position relative to the main body in which the unloading clutch assembly is drivingly coupled to a corresponding reel of the at least one reel to rotate the corresponding reel under driving of the driver assembly to wind a corresponding wire of the at least one wire around the corresponding reel; and (ii) a second position relative to the main body in which the unloading clutch assembly is drivingly separated from the corresponding reel, and wherein the at least one material feeding mechanism is for use with the corresponding reel of the at least one reel to feed the at least one wire to the 3D printer.

DETAILED DESCRIPTION

Figure 1:
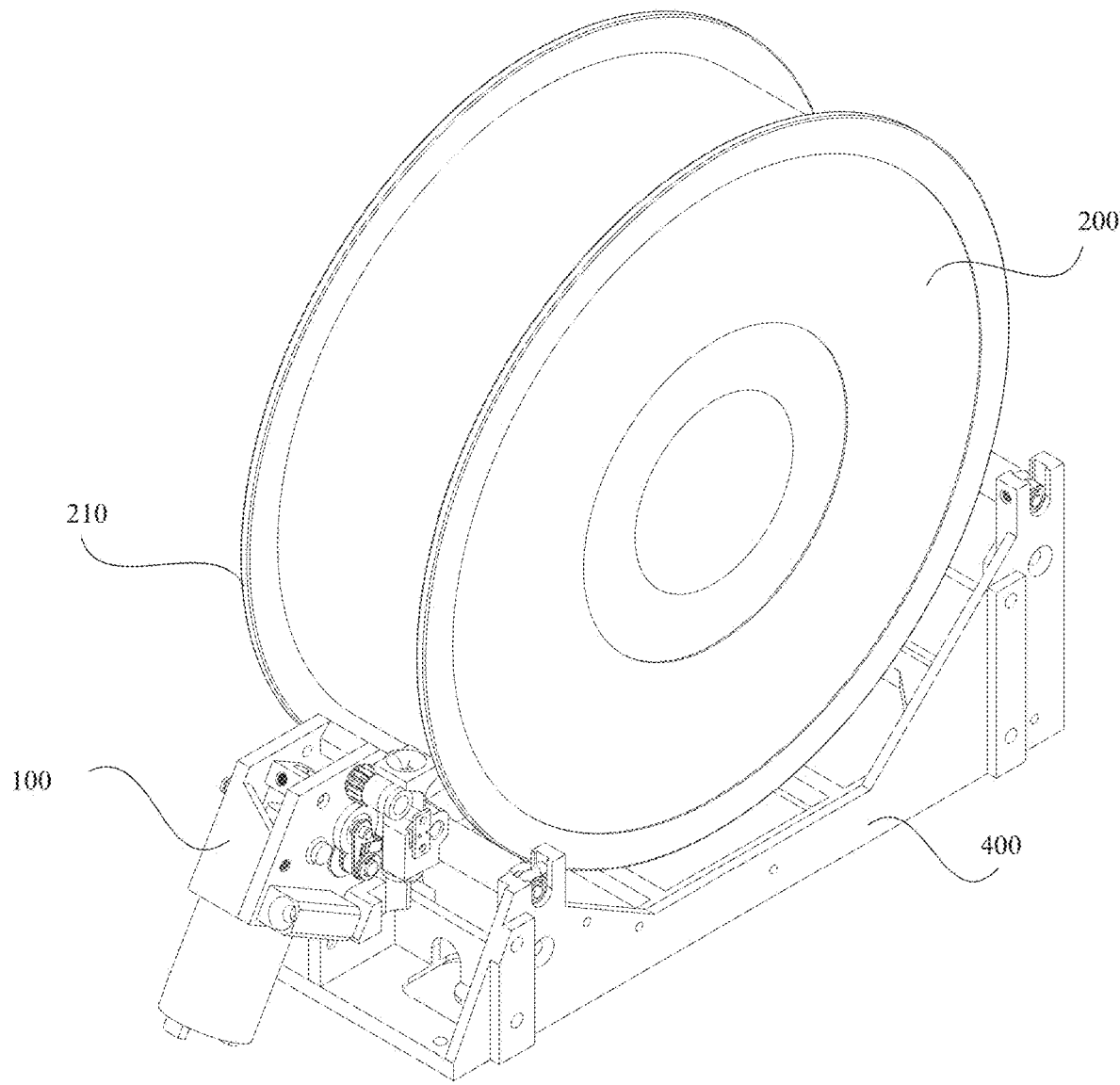
FIG. 1 is a schematic structural diagram of a material feeding module in a multi-material unit according to some embodiments of the present disclosure.

It is to be understood that although terms such as first, second and third may be used herein to describe various elements, components, regions, layers and/or portion, these elements, components, regions, layers and/or portion should not be limited by these terms. These terms are merely used to distinguish one element, component, region, layer or portion from another. Therefore, a first element, component, region, layer or portion discussed below may be referred to as a second element, component, region, layer or portion without departing from the teaching of the present disclosure.

Spatially relative terms such as "under", "below", "lower", "beneath", "above" and "upper" may be used herein for ease of description to describe the relationship between one element or feature and another element(s) or feature(s) as illustrated in the figures. It will be understood that these spatially relative terms are intended to cover different orientations of a device in use or operation in addition to the orientations depicted in the figures. For example, if the device in the figures is turned over, an element described as being "below other elements or features" or "under other elements or features" or "beneath other elements or features" will be oriented to be "above other elements or features". Thus, the exemplary terms "below" and "beneath" may cover both orientations "above" and "below". Terms such as "before" or "ahead" and "after" or "then" may similarly be used, for example, to indicate the order in which light passes through elements. The device may be oriented in other ways (rotated by 90 degrees or in other orientations), and the spatially relative descriptors used herein are interpreted correspondingly. In addition, it will also be understood that when a layer is referred to as being "between two layers", it may be the only layer between the two layers, or there may also be one or more intermediate layers.

The terms used herein are merely for the purpose of describing specific embodiments and are not intended to limit the present disclosure. As used herein, the singular forms "a", "an", and "the" are intended to include plural forms as well, unless otherwise explicitly indicted in the context. It is to be further understood that the terms "comprise" and/or "include", when used in this specification, specify the presence of described features, entireties, steps, operations, elements and/or components, but do not exclude the presence or addition of one or more other features, entireties, steps, operations, elements, components and/or groups thereof. As used herein, the term "and/or" includes any and all combinations of one or more of the associated listed items, and the phrase "at least one of A and B" refers to only A, only B, or both A and B.

It is to be understood that when an element or a layer is referred to as being "on another element or layer", "connected to another element or layer", "coupled to another element or layer", or "adjacent to another element or layer", the element or layer may be directly on another element or layer, directly connected to another element or layer, directly coupled to another element or layer, or directly adjacent to another element or layer, or there may be an intermediate element or layer. On the contrary, when an element is referred to as being "directly on another element or layer", "directly connected to another element or layer", "directly coupled to another element or layer", or "directly adjacent to another element or layer", there is no intermediate element or layer. However, under no circumstances should "on" or "directly on" be interpreted as requiring one layer to completely cover the underlying layer.

Embodiments of the present disclosure are described herein with reference to schematic illustrations (and intermediate structures) of idealized embodiments of the present disclosure. Because of this, variations in an illustrated shape, for example as a result of manufacturing techniques and/or tolerances, should be expected. Therefore, the embodiments of the present disclosure should not be interpreted as being limited to a specific shape of a region illustrated herein, but should comprise shape deviations caused due to manufacturing, for example. Therefore, the region illustrated in a figure is schematic in nature, and the shape thereof is neither intended to illustrate the actual shape of the region of a device, nor to limit the scope of the present disclosure.

Unless otherwise defined, all terms (including technical and scientific terms) used herein have the same meanings as commonly understood by those of ordinary skill in the art to which the present disclosure belongs. It is to be further understood that the terms such as those defined in commonly used dictionaries should be interpreted as having meanings consistent with the meanings thereof in relevant fields and/or in the context of this specification, and will not be interpreted in an ideal or too formal sense, unless thus defined explicitly herein.

In the related art, a multi-material unit may comprise a material guide tube, a reel, a loading friction wheel and a motor connected to the loading friction wheel. A wire is wound around the reel, and an end of the wire is in contact with the friction wheel. During loading, the motor drives the loading friction wheel to rotate forward, so as to deliver the wire into the material guide tube. A 3D printer uses the wire in the material guide tube to achieve printing. When the printing is finished or the wire is replaced, the motor drives the loading friction wheel to rotate reversely so as to withdraw the wire from the material guide tube into the multi-material unit.

However, the wire in the related art is suspended or accumulated in the multi-material unit after being withdrawn, the wire is likely to be entangled in other parts, affecting the normal operation of the multi-material unit, and the messy wire will cause poor tidiness of the multi-material unit.

Embodiments of the present disclosure provide a material feeding mechanism, a multi-material unit and a 3D printing system. A driver assembly and an unloading clutch assembly are provided, wherein the driver assembly can be drivingly coupled to a reel through the unloading clutch assembly, so as to drive the reel to rotate to wind back a wire around the reel, thereby preventing the wire from being suspended or accumulated.

The present disclosure is described in detail below with reference to the embodiments. It will be appreciated that in order to more clearly illustrate the structures of the embodiments of the present disclosure, only a complete structure of some of gears is shown in the drawings of the present disclosure, and that other gears are represented by a cylindrical structure, the structural details of which are not shown.

Figure 2:
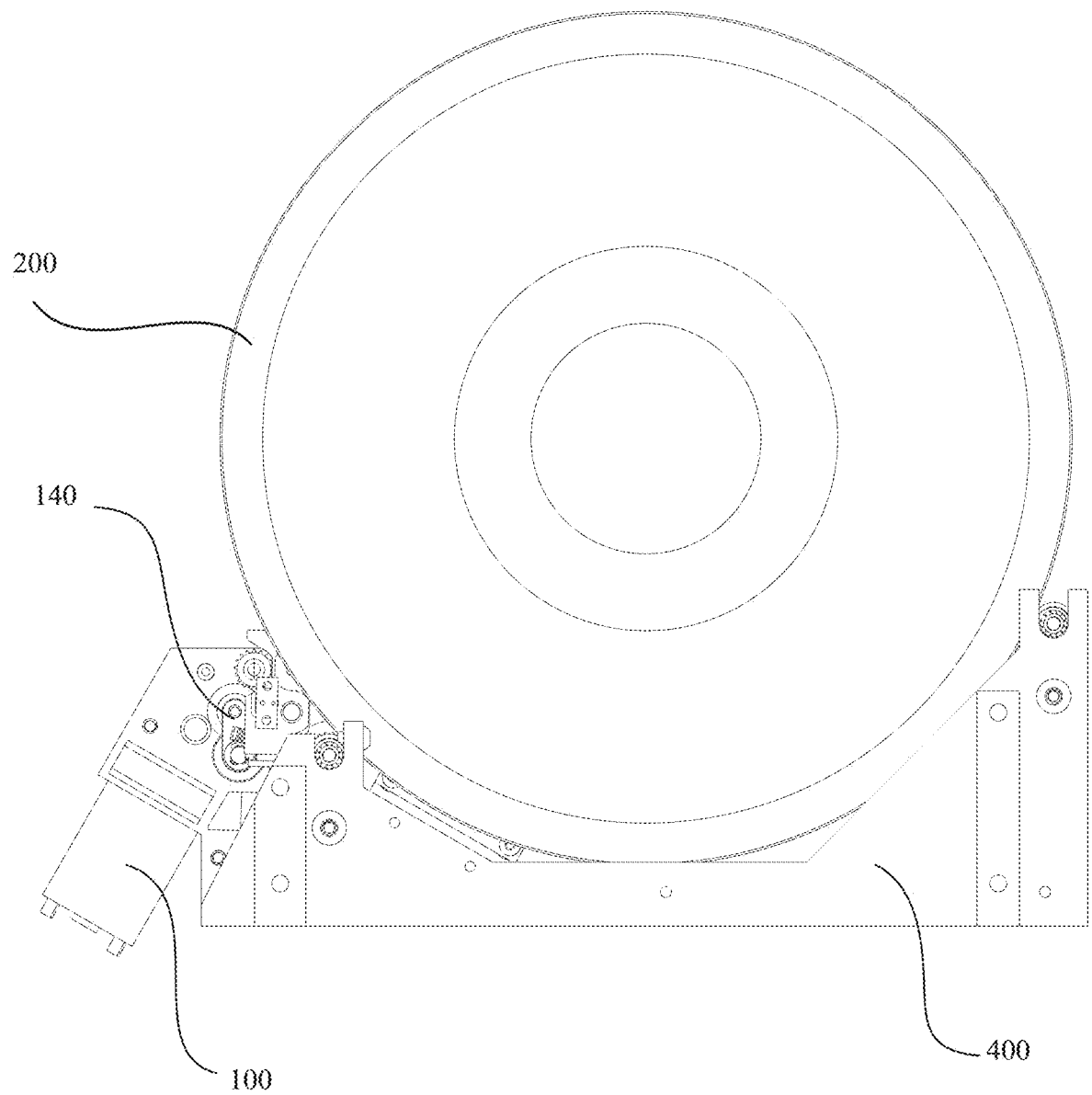
FIG. 2 is a right side view of the material feeding module of FIG. 1.
Figure 3:
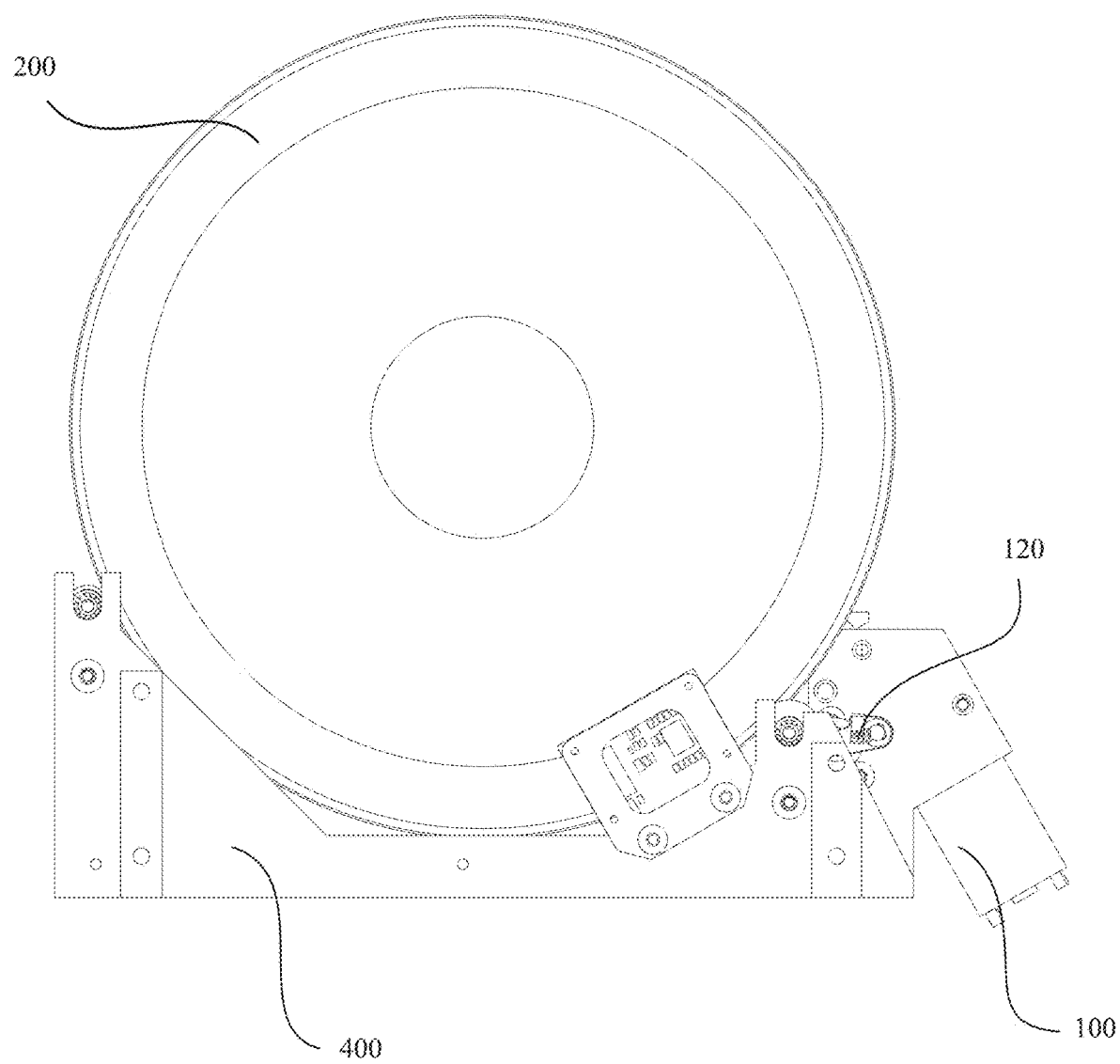
FIG. 3 is a left side view of the material feeding module of FIG. 1.

FIG. 1 is a schematic structural diagram of a material feeding module in a multi-material unit according to some embodiments of the present disclosure; FIG. 2 is a right side view of the material feeding module of FIG. 1; FIG. 3 is a left side view of the material feeding module of FIG. 1; and FIG. 4 is a partial schematic structural diagram of the material feeding module of FIG. 1 with a reel removed.

It will be appreciated that the multi-material unit may comprise at least one material feeding module and a material guide tube (not shown) shared by the at least one material feeding module. When the 3D printer needs to use a wire of a certain color or material, the material feeding module having the wire in the multi-material unit delivers the wire into the material guide tube. A printing motor in the 3D printer pulls the wire in the material guide tube and delivers it to a hot end of the 3D printer to implement a printing operation. In an example of FIGS. 1 to 3, the material feeding module comprises a material feeding mechanism 100, a reel 200, and a reel holder 400. A wire is wound around the reel 200, and the reel 200 is rotatably connected to the reel holder 400. The material feeding mechanism 100 is connected to the reel holder 400.

Figure 4:
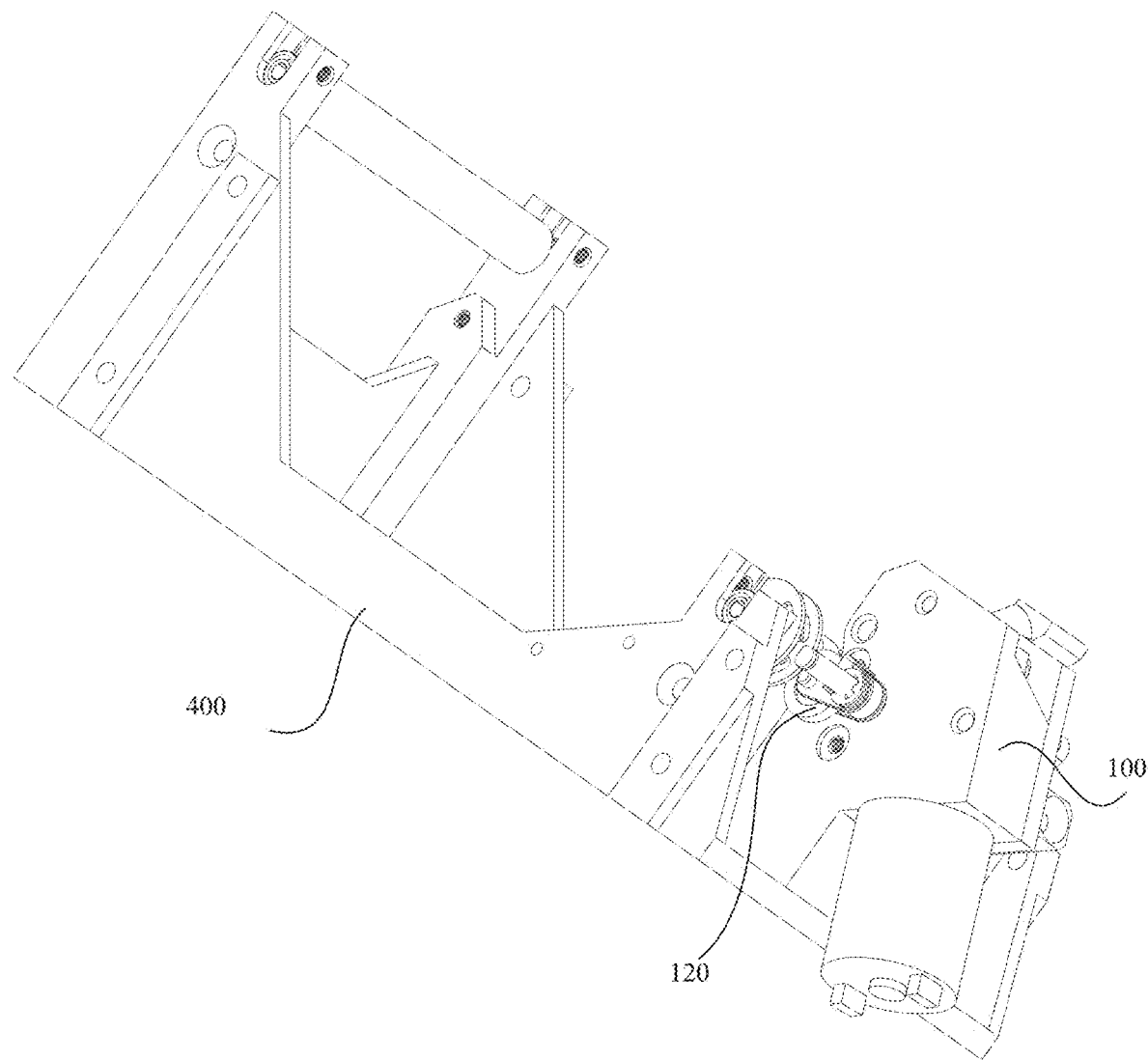
FIG. 4 is a schematic structural diagram of the material feeding module of FIG. 1 with a reel removed.
Figure 5:
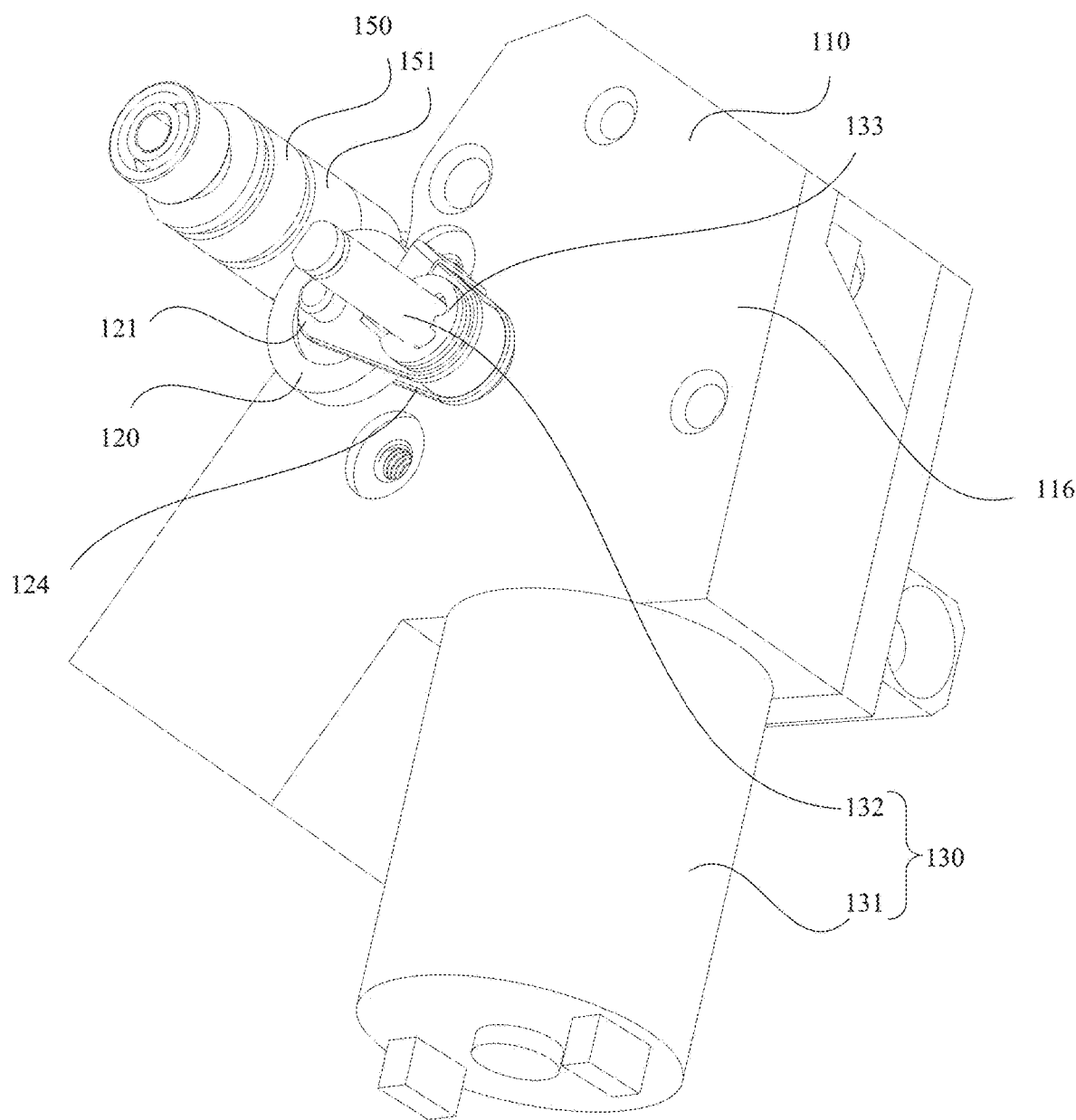
FIG. 5 is an axonometric view of the material feeding mechanism in FIG. 4 at a first angle.
Figure 6:
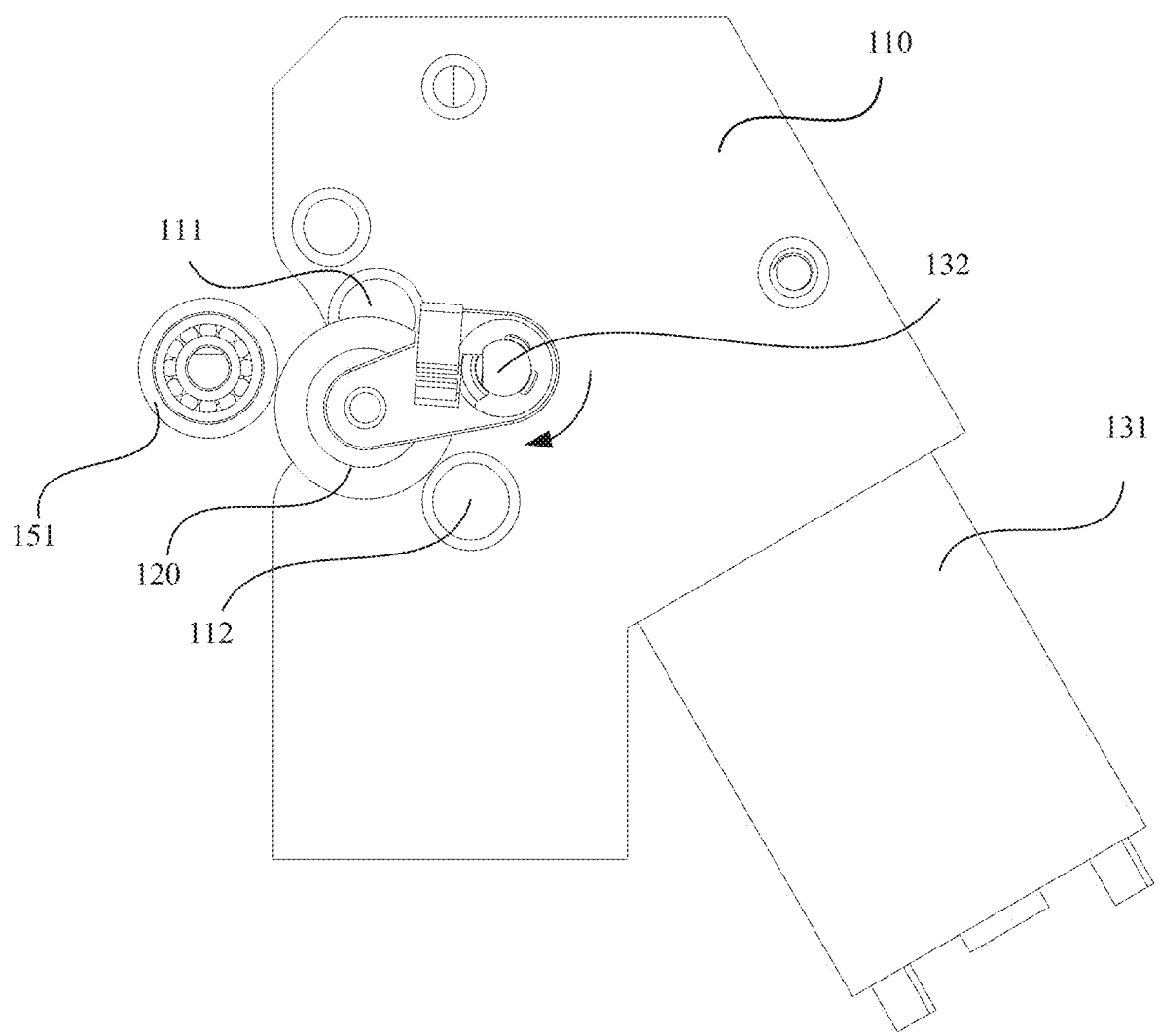
FIG. 6 is a schematic structural diagram of an unloading clutch assembly in the material feeding mechanism of FIG. 5 in a first position according to some embodiments of the present disclosure.
Figure 7:
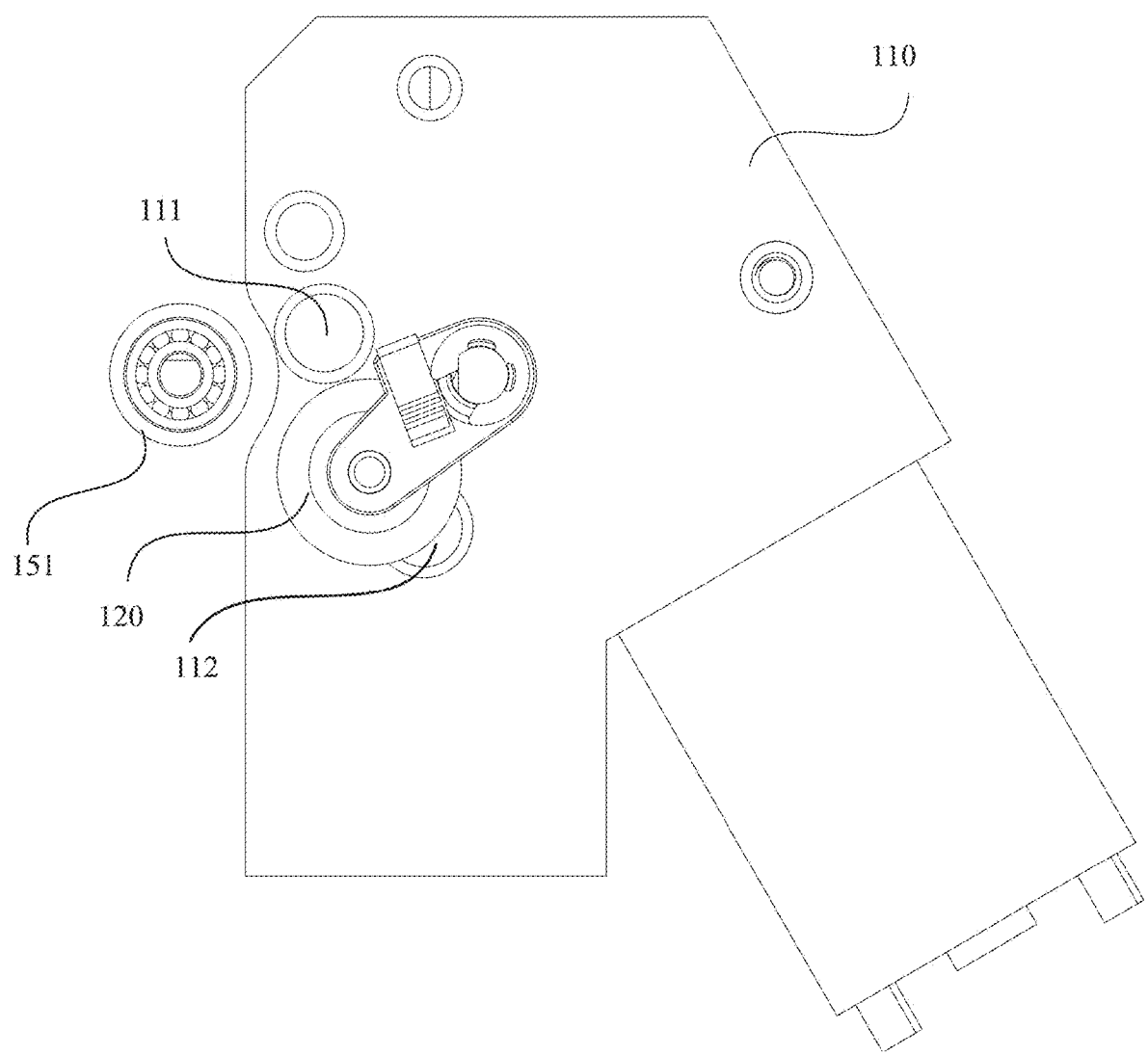
FIG. 7 is a schematic structural diagram of the unloading clutch assembly in the material feeding mechanism of FIG. 5 in a second position according to some embodiments of the present disclosure.

FIG. 5 is an axonometric view of the material feeding mechanism 100 in FIG. 4 at a first angle; FIG. 6 is a schematic structural diagram of an unloading clutch assembly in the material feeding mechanism of FIG. 5 in a first position; and FIG. 7 is a schematic structural diagram of the unloading clutch assembly in the material feeding mechanism of FIG. 5 in a second position. For ease of illustration, an unloading friction wheel 150 shown in FIG. 5 is hidden in FIGS. 6 and 7. Referring to FIGS. 5 to 7, the material feeding mechanism 100 comprises a main body 110, an unloading clutch assembly 120 and a driver assembly 130.

The main body 110 may be a supporting component of the material feeding mechanism 100 that may be connected to the reel holder 400. The main body 110 may be made of a common material such as a metallic material or a plastic material.

The unloading clutch assembly 120 and the driver assembly 130 are both coupled to the main body 110. The unloading clutch assembly 120 may be switched between a first position relative to the main body 110 (the position shown in FIG. 6) and a second position relative to the main body 110 (the position shown in FIG. 7) under driving of the driver assembly 130.

When the unloading clutch assembly 120 is in the first position, the unloading clutch assembly 120 may be drivingly coupled to the reel 200. The unloading clutch assembly 120 may transfer a driving force output by the driver assembly 130 to the reel 200 so that the reel 200 can rotate under driving of the driver assembly 130, so as to wind the wire around the reel 200.

When the unloading clutch assembly 120 is in the second position, the unloading clutch assembly 120 is drivingly separated from the reel 200, that is, the driving force of the driver assembly 130 cannot be transferred to the reel 200.

The driver assembly 130 may comprise a motor capable of outputting a rotational motion or a linear motion, a hydraulic cylinder, an air cylinder, etc. Various structures of the unloading clutch assembly 120 may also be possible. In some embodiments, the driver assembly 130 may comprise a rotary motor capable of outputting a rotational motion and a linear motor capable of outputting a linear motion, a rotating shaft of the reel 200 may be provided with a driven gear, and the unloading clutch assembly 120 may comprise a driving gear which can be meshed with the driven gear. In some embodiments, the driver assembly 130 may comprise a rotary motor but has no linear motor, as described in further detail below.

In an embodiment where the driver assembly 130 comprises a linear motor, the linear motor may be mounted on the main body 110, a motor housing of the rotary motor may be coupled to an output shaft of the linear motor, and an output shaft of the rotary motor may be coaxially connected to the driving gear. The linear motor may synchronously drive the rotary motor and the driving gear to move in a linear direction, so that the driving gear is switched between the first position and the second position. When the driving gear is in the first position, the rotary motor may drive the driving gear to rotate, and the reel 200 is driven to rotate through the driven gear meshed with the driving gear, so as to wind the wire around the reel 200. When the driving gear is in the second position, the driving gear is separated from the driven gear, and power cannot be transferred to the driven gear from the rotary motor.

It may be appreciated that when the 3D printer completes printing or wire replacement is required, the driver assembly 130 drives the unloading clutch assembly 120 to move to the first position relative to the main body 110, and the unloading clutch assembly 120 is drivingly coupled to the reel 200. The driver assembly 130 can drive the reel 200 to rotate through the unloading clutch assembly 120, so as to withdraw the wire from the material guide tube and rewind the wire around the reel 200, thereby preventing the wire from being suspended or accumulated. Further, the wire is prevented from being wound around other components, such that the multi-material unit can normally work with a high reliability. Moreover, the multi-material unit can also be tidier.

When the 3D printer needs to execute a printing operation, the driver assembly 130 may, for example, drive the unloading clutch assembly 120 to move to the second position relative to the main body 110, so as to separate the unloading clutch assembly 120 from the reel 200. The wire in the material guide tube may be continuously delivered to the hot end (not shown) of the 3D printer under driving of the printing motor of the 3D printer. Since the unloading clutch assembly 120 is drivingly separated from the reel 200, the unloading clutch assembly 120 does not hinder the rotation of the reel 200, the reel 200 may freely rotate relative to the reel holder 400 under driving of the wire, and the 3D printing system can normally print a three-dimensional object. In addition, the driver assembly 130 is not driven by the reel 200 during the printing operation, reducing unnecessary abrasion.

According to the material feeding mechanism provided by the embodiments of the present disclosure, the unloading clutch assembly and the driver assembly are arranged on the main body of the material feeding mechanism, such that the driver assembly can drive the unloading clutch assembly to be switched between the first position relative to the main body and the second position relative to the main body. In the first position, the unloading clutch assembly is drivingly coupled to the reel and can rotate the reel under driving of the driver assembly to wind the wire around the reel, thereby preventing the wire from being suspended or accumulated in the material feeding mechanism after unloading, and improving the reliability and tidiness of the multi-material unit. In the second position, the unloading clutch assembly is drivingly separated from the reel, and the 3D printing system can normally print a three-dimensional object.

With continued reference to FIG. 1, in this example, the reel 200 may comprise an intermediate body and flanges 210 located on two sides of the intermediate body respectively. The intermediate body may be configured to wind the wire, and the flanges 210 may each protrude from the intermediate body in a circumferential direction, thereby functioning to block the wire, and preventing the wire from being released from the reel 200.

With continued reference to FIGS. 5 to 7, in some embodiments, the material feeding mechanism 100 may further comprise an unloading friction wheel 150 rotatably connected to the main body 110. The unloading friction wheel 150 has a wheel surface for force fit connection with the flanges 210 of the reel 200. When the unloading clutch assembly 120 is in the first position, the unloading clutch assembly 120 is drivingly coupled to the unloading friction wheel 150 to rotate the reel 200 through the unloading friction wheel 150. When the unloading clutch assembly 120 is in the second position, the unloading clutch assembly 120 is drivingly separated from the unloading friction wheel 150 so that the unloading clutch assembly 120 is drivingly separated from the reel 200.

The unloading friction wheel 150 may be of a wheel-like structure, the wheel surface of which may be provided with knurls or other structures. When the unloading clutch assembly 120 is in the first position, the unloading clutch assembly 120 may be drivingly connected to the unloading friction wheel 150, and the driving force of the driver assembly 130 may be transferred to the unloading friction wheel 150 through the unloading clutch assembly 120 and transferred to the flanges 210 through the unloading friction wheel 150 so as to drive the reel 200 to rotate. Since the wheel surface of the unloading friction wheel 150 is provided with the knurls, a static friction force between the wheel surface and the flanges 210 may be increased, so that the reel 200 can be effectively driven to rotate. This solution is simple in structure and easy to implement. In addition, power is transferred between the reel 200 and the material feeding mechanism 100 through the surface where the wheel surface of the unloading friction wheel 150 is in contact with the flanges 210 of the reel 200, without the need for complex design of the structure of the reel 200, and the reel 200 may be conveniently taken out of the reel holder 400, facilitating replacement of the reel 200.

Figure 8:
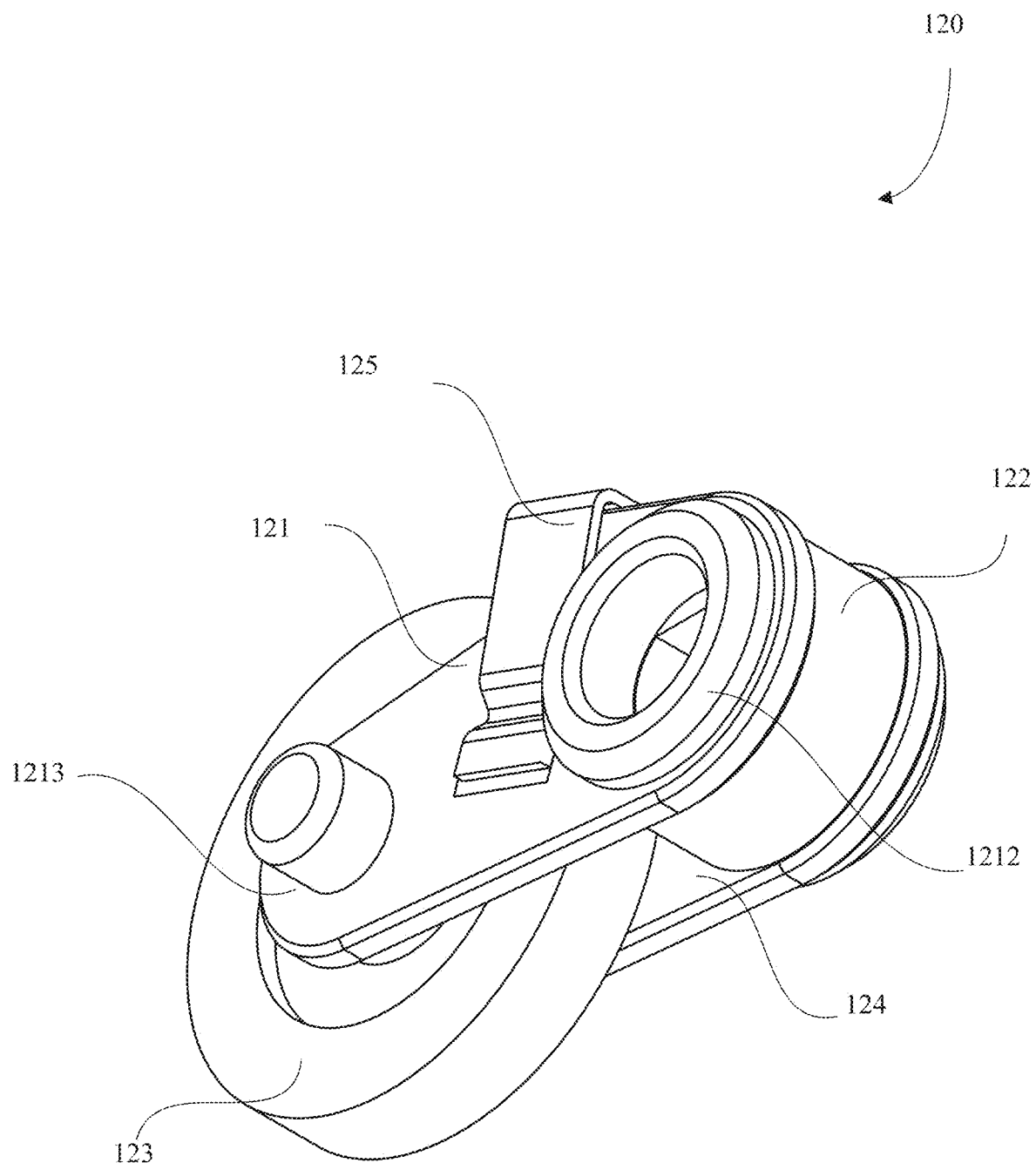
FIG. 8 is a schematic structural diagram of the unloading clutch assembly in the material feeding mechanism of FIG. 5.
Figure 9:
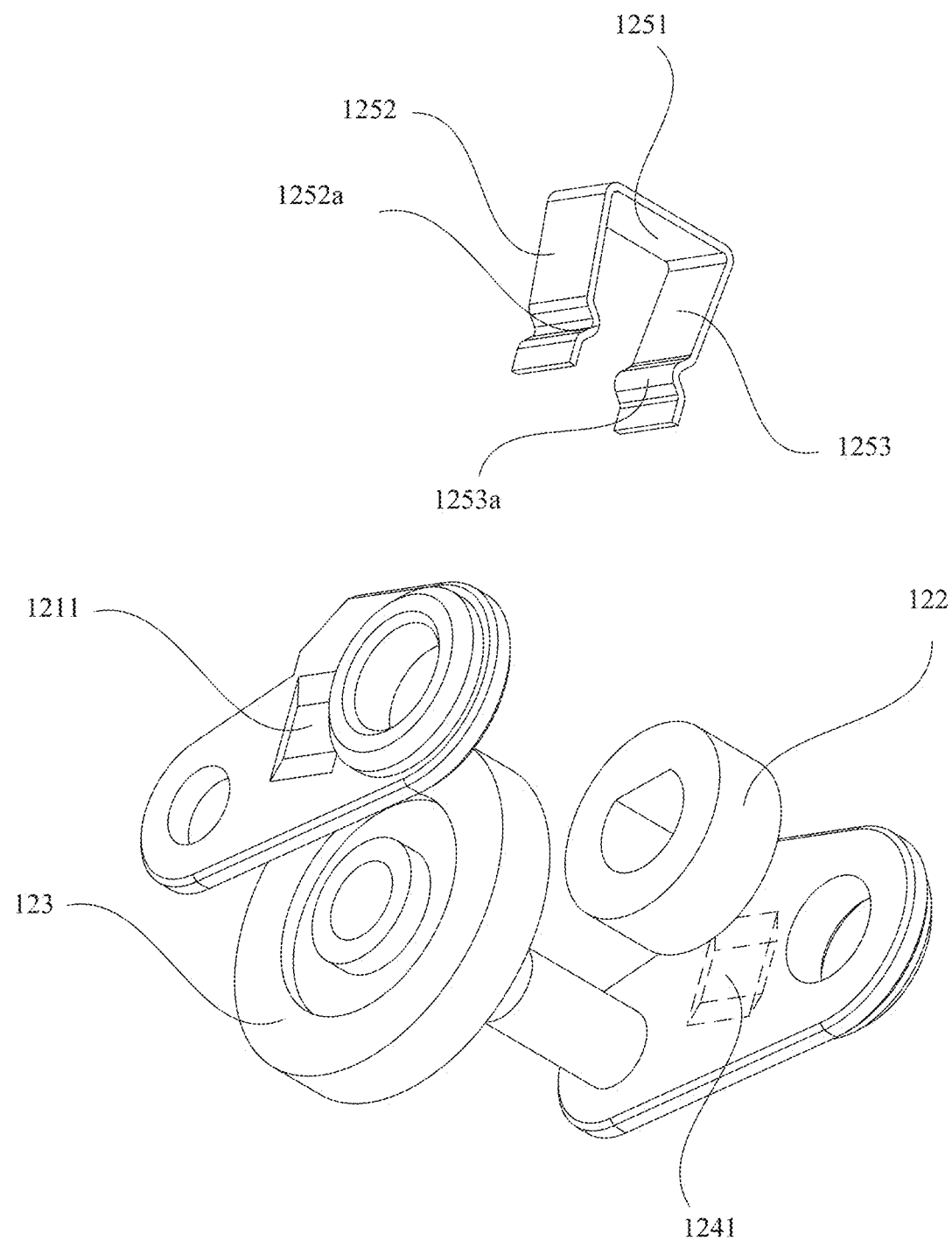
FIG. 9 is an exploded schematic diagram of the unloading clutch assembly of FIG. 8.

FIG. 8 is a schematic structural diagram of the unloading clutch assembly 120 in the material feeding mechanism of FIG. 5; and FIG. 9 is an exploded schematic diagram of the unloading clutch assembly 120 of FIG. 8. With continued reference to FIGS. 5, 8 and 9, in some embodiments, the driver assembly 130 may comprise a driving motor 131 connected to the main body 110 and a transmission shaft 132 drivingly coupled to an output shaft of the driving motor 131. The unloading clutch assembly 120 may comprise a first connecting member 121, a first gear 122, and a second gear 123.

The first gear 122 is sleeved on the transmission shaft 132 and is in form-fit connection to the transmission shaft 132. That is, the first gear 122 may be provided with a non-circular through hole, and the transmission shaft 132 may have a mating section that matches the non-circular through hole in shape. The transmission shaft 132 may be sleeved at the mating section so that the first gear 122 may remain stationary relative to the transmission shaft 132. When the transmission shaft 132 rotates under driving of the driving motor 131, the first gear 122 may rotate together therewith.

The first connecting member 121 may be located on one side of the first gear 122 in a rotation axis direction of the first gear 122. The first connecting member 121 comprises a first end 1212 sleeved on the transmission shaft 132 and a second end 1213 opposite to the first end 1212. The first connecting member 121 may be machined from a common material such as metal or plastic. The first end 1212 of the first connecting member 121 may be provided with a first through hole through which the transmission shaft 132 may pass.

The second gear 123 is rotatably connected to the second end 1213 of the first connecting member 121. In an example, the second end 1213 of the first connecting member 121 may be provided with a second through hole, and a rotary shaft passes through the second gear 123 and the second through hole, so as to connect the second gear 123 to the first connecting member 121. In another example, the second end 1213 of the first connecting member 121 is integrally provided with a rotary shaft, which passes through the second gear 123, so as to rotatably connect the second gear 123 to the first connecting member 121.

The first gear 122 is meshed with the second gear 123. From a position point of view, the first gear 122 and the second gear 123 are located at the two ends of the first connecting member 121 respectively, and the first connecting member 121 abuts against the first gear 122. It may be appreciated that although the first end 1212 of the first connecting member 121 is sleeved on the transmission shaft 132, no direct fixation is performed therebetween. The first connecting member 121 may be kept relatively fixed through a pressure generated by the abutment against the first gear 122, and the pressure may cause a frictional force between the first connecting member 121 and the first gear 122, which allows the first connecting member 121 and the second gear 123 to be circumferentially pivoted around the transmission shaft 132 with the rotation of the transmission shaft 132 and the first gear 122. That is, the first gear 122, the second gear 123, and the first connecting member 121 may rotate as a whole with the rotation of the transmission shaft 132. In addition, when an external force is present, it may be used to overcome the frictional force between the first connecting member 121 and the first gear 122 so that the first connecting member 121 and the second gear 123 can rotate as a whole relative to the first gear 122. That is, the first connecting member 121 and the second gear 123 may be circumferentially pivoted around the transmission shaft 132.

To allow the first gear 122 to abut against the first connecting member 121, the transmission shaft 132 may be provided with two shoulders, each of which may have a diameter greater than that of the transmission shaft 132. The two shoulders may be located on two sides of the unloading clutch assembly 120 in an axial direction of the transmission shaft 132 respectively, the first connecting member 121 may abut against one of the shoulders, and the first gear 122 may abut against the other shoulder. Rational adjustment of the dimension between the two shoulders allows the first connecting member 121 to abut against the first gear 122.

In an example, to allow the second gear 123 to drive the unloading friction wheel 150 to rotate, the unloading friction wheel 150 may comprise a first wheel body and a second wheel body sequentially arranged in an axial direction of the unloading friction wheel 150. The first wheel body and the second wheel body may be integrally machined and formed. The first wheel body has a wheel surface provided with knurls, and the second wheel body may have a plurality of teeth arranged in a circumferential direction. The second wheel body may be configured to mesh with the second gear 123.

Referring to FIGS. 6 and 8, when the 3D printer completes printing or wire replacement is required, the driving motor 131 drives the transmission shaft 132 to rotate in a first direction (the arrow direction in FIG. 6), thereby driving the first connecting member 121, the first gear 122 and the second gear 123 to rotate as a whole relative to the main body 110, so that the second gear 123 can swing to a position where it can be meshed with the second wheel body of the unloading friction wheel 150, that is, the unloading clutch assembly 120 is in the first position. Since the unloading friction wheel 150 is meshed with the second gear 123, when the driving motor 131 continues to drive the transmission shaft 132 to rotate in the first direction, the unloading friction wheel 150 provides a resistance against the rotation of the second wheel body 122 and the first connecting member 121 in the circumferential direction of the transmission shaft 132. This resistance can overcome the frictional force between the first connecting member 121 and the first gear 122, so that relative rotation occurs between the first gear 122 and the first connecting member 121. That is, the first gear 122 may continue to rotate with the transmission shaft 132, while the first connecting member 121 may remain stationary relative to the main body 110. Since the first gear 122 is meshed with the second gear 123, the first gear 122 may rotate with the transmission shaft 132 to drive the second gear 123 to rotate relative to the first connecting member 121, while the second gear 123 may drive the unloading friction wheel 150 to rotate through the second wheel body and then drive the reel 200 to rotate. According to the solution, the structure is simple, the unloading clutch assembly 120 can be moved between the first position and the second position through one driving motor 131, so that the cost can be reduced. Referring to FIGS. 5 and 7, when the driving motor 131 drives the transmission shaft 132 to rotate in a second direction opposite to the first direction, the second gear 123 may be drivingly separated from the second wheel body, and the unloading clutch assembly 120 is in the second position.

In the embodiment described above, the unloading friction wheel 150 comprises the first wheel body configured to be drivingly coupled to the reel 200 and the second wheel body configured to be drivingly coupled to the unloading clutch assembly 120. In another embodiments, the material feeding mechanism 100 may further comprise a first mating gear 151 coaxially connected to the unloading friction wheel 150, as shown in FIG. 5. For example, the main body 110 may be provided with a rotatable unloading rotary shaft, and the first mating gear 151 and the unloading friction wheel 150 may be both in form-fit connection to the unloading rotary shaft, so that the machining of the unloading friction wheel 150 can be simplified, and the cost can be reduced.

The first mating gear 151 is configured such that when the unloading clutch assembly 120 is in the first position, the first mating gear 151 is meshed with the second gear 123 of the unloading clutch assembly 120. The second gear 123 may drive the first mating gear 151 to rotate and then drive the unloading friction wheel 150 to rotate. Moreover, when the unloading clutch assembly 120 is in the second position, the first mating gear 151 is disengaged from the second gear 123 of the unloading clutch assembly 120.

In some embodiments, the unloading clutch assembly 120 further comprises a second connecting member 124 arranged opposite to the first connecting member 121 with respect to the first gear 122 and the second gear 123.

With continued reference to FIGS. 8 and 9, the first connecting member 121 and the second connecting member 124 may be located on two sides of the first gear 122 and the second gear 123 respectively in the axial direction of the transmission shaft 132. The two sides of the first gear 122 may abut against the first connecting member 121 and the second connecting member 124 respectively.

The second connecting member 124 may also be sleeved on the transmission shaft 132, with particular reference to a connection mode between the first end 1212 of the first connecting member 121 and the transmission shaft 132.

In an example, the second end 1213 of the first connecting member 121 is integrally provided with a rotary shaft, the second connecting member 124 is provided with a shaft hole at a corresponding position, and the rotary shaft passes through the second gear 123 and the shaft hole, so as to rotatably connect the second gear 123 between the first connecting member 121 and the second connecting member 124. In another example, the second connecting member 124 is provided with a rotary shaft, the first connecting member 121 is provided with a shaft hole, and the rotary shaft passes through the second gear 123 and the shaft hole.

The unloading clutch assembly 120 may comprise an elastic clamp member 125. The elastic clamp member 125 bridges the first connecting member 121 and the second connecting member 124 to provide an elastic force enabling the first connecting member 121 and the second connecting member 124 to clamp the first gear 122. The elastic clamp member 125 may continuously provide the elastic force to improve the reliability of the unloading clutch assembly 120.

Various structures of the elastic clamp member 125 may be possible. As an example, the elastic clamp member 125 may comprise a spring having one end connected to the first connecting member 121 and the other end connected to the second connecting member 124. The spring may provide a pulling force such that the first connecting member 121 and the second connecting member 124 clamp the first gear 122.

As another example, the elastic clamp member 125 comprises an elastic clamp member body 1251 axially extending parallel to the transmission shaft 132 and two clamping jaws connected to two ends of the elastic clamp member body 1251 respectively. For ease of description, the two clamping jaws are named a first clamping jaw 1252 and a second clamping jaw 1253 respectively. The first clamping jaw 1252 abuts against an outer surface of the first connecting member 121 facing away from the first gear 122 and the second gear 123, and the second clamping jaw 1253 abuts against an outer surface of the second connecting member 124 facing away from the first gear 122 and the second gear 123.

The distance between the first clamping jaw 1252 and the second clamping jaw 1253 may be smaller than the distance between the outer surface of the first connecting member 121 and the outer surface of the second connecting member 124, so that when the elastic clamp member 125 bridges the first connecting member 121 and the second connecting member 124, the first clamping jaw 1252 and the second clamping jaw 1253 may elastically deform relative to the elastic clamp member body 1251, and the distance therebetween becomes larger, and accordingly the elastic force for clamping the first connecting member 121 and the second connecting member 124 can be provided. In addition, the first clamping jaw 1252, the second clamping jaw 1253 and the elastic clamp member body 1251 may all be arranged against or close to the first connecting member 121 and the second connecting member 124, so that the space volume of the unloading clutch assembly 120 can be reduced.

In an example, the outer surface of the first connecting member 121 is provided with a first groove 1211, and the outer surface of the second connecting member 124 is provided with a second groove 1241. The first clamping jaw 1252 is provided with a first protrusion 1252a engaged with the first groove 1211, and the second clamping jaw 1253 is provided with a second protrusion 1253a engaged with the second groove 1241. This can improve the contact area between the first connecting member 121 and the first clamping jaw 1252, and between the second connecting member 124 and the second clamping jaw 1253, so that the elastic clamp member 125 is not prone to being released from the first connecting member 121 and the second connecting member 124, improving the reliability of the unloading clutch assembly 120.

In some embodiments, the main body 110 may also be provided with a first position limiter 111 and a second position limiter 112. The unloading clutch assembly 120 is movable between the first position limiter 111 and the second position limiter 112. The first position limiter 111 and the second position limiter 112 may be both configured to protrude from the main body 110. Taking the first position limiter 111 as an example, the first position limiter 111 may comprise a bolt, a threaded section of the bolt may be screwed into a threaded hole of the main body 110, and a head portion of the bolt may be located outside the threaded hole.

The first position limiter 111 is positioned on a movement path of the unloading clutch assembly 120 relative to the main body 110 such that the unloading clutch assembly 120 is in the first position when moved to abut against the first position limiter 111. Referring to FIGS. 6 and 8, the first position limiter 111 is arranged with respect to the second end 1213 of the second connecting member 124 of the unloading clutch assembly 120 such that when the unloading clutch assembly 120 is in the first position, an upper edge of the second end 1213 of the second connecting member 124 may abut against the first position limiter 111. The first position limiter 111 may provide a resistance against the frictional force between the first connecting member 121 and the first gear 122 so that the unloading clutch assembly 120 may remain in the first position. By means of the first position limiter 111, it is also possible to reduce a contact force between the second gear 123 and the first mating gear 151, reduce the abrasion of the two gears, and prolong the service life of the unloading clutch assembly 120.

The second position limiter 112 is positioned on a movement path of the unloading clutch assembly 120 relative to the main body 110 such that the unloading clutch assembly 120 is in the second position when moved to abut against the second position limiter 112. Referring to FIGS. 7 and 8, the second position limiter 112 is arranged with respect to the second end 1213 of the second connecting member 124 of the unloading clutch assembly 120 such that when the unloading clutch assembly 120 is in the second position, a lower edge of the second end 1213 of the second connecting member 124 may abut against the second position limiter 112. The second position limiter 112 may provide a resistance against the frictional force between the first connecting member 121 and the first gear 122 so that when the transmission shaft 132 continues to rotate in the second direction, the unloading clutch assembly 120 may remain in the second position, which can shorten the movement path of the unloading clutch assembly 120 and reduce the useless movement of the unloading clutch assembly 120.

It may be appreciated that the size by which the first position limiter 111 and the second position limiter 112 protrude from the main body 110 is greater than a gap between the second connecting member 124 and the main body 110, but smaller than a gap between the second gear 123 and the main body 110. In this way, the first position limiter 111 and the second position limiter 112 can play a limiting role but do not interfere with the normal rotation of the second gear 123.

The functions of the first position limiter 111 and the second position limiter 112 are described above by way of example in which the second connecting member 124 of the unloading clutch assembly 120 is located between the first connecting member 121 and the main body 110 (as shown in FIG. 5). In some embodiments, the first connecting member 121 may be located between the second connecting member 124 and the main body 110, and the first position limiter 111 and the second position limiter 112 may then be configured to abut against an upper edge and a lower edge of the first connecting member 121 respectively. The spatially relative terms "upper" and "lower" herein are used with reference to FIGS. 6 and 7 and should not be construed as being limiting.

Figure 10:
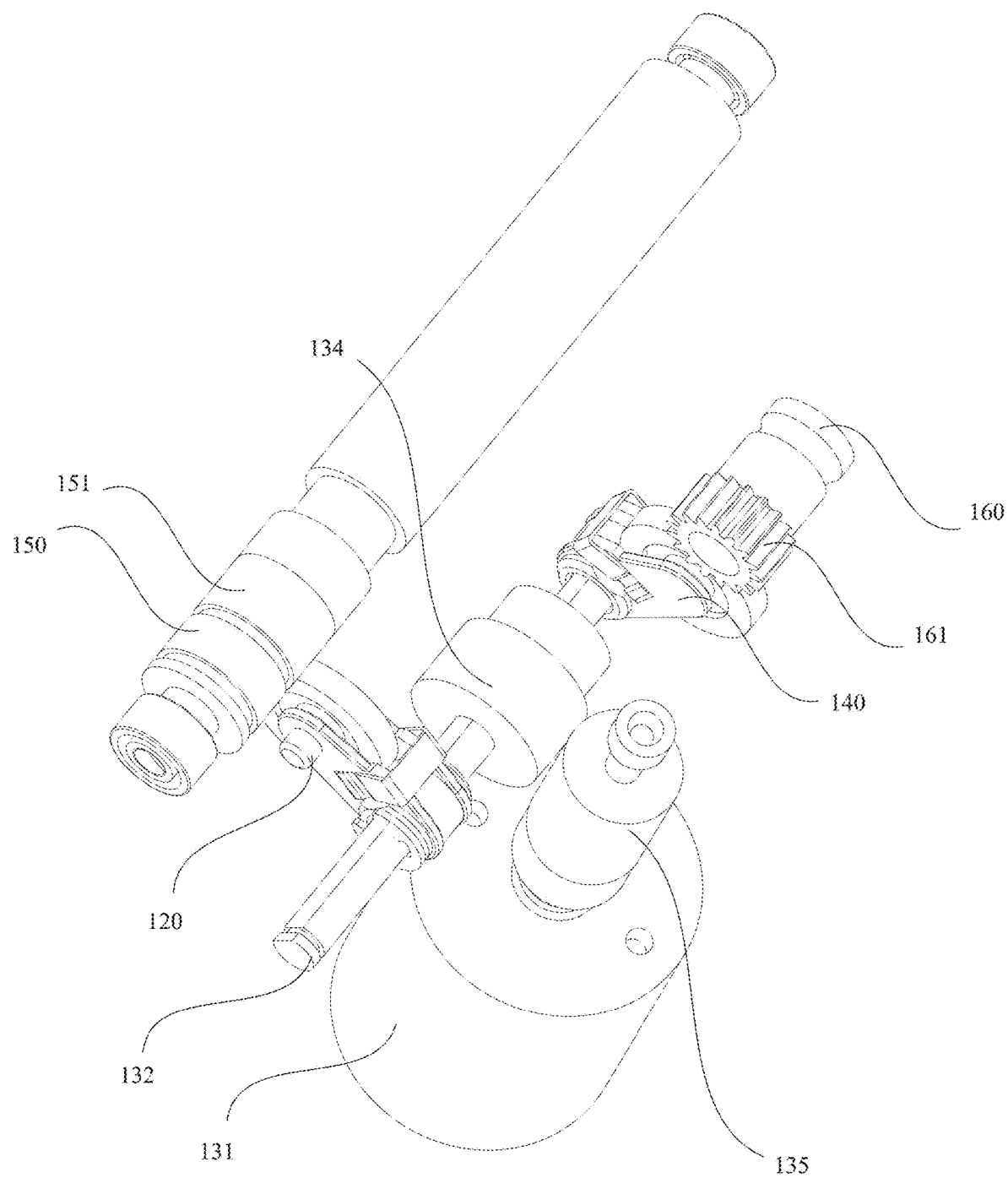
FIG. 10 is a schematic structural diagram of the material feeding mechanism of FIG. 5 with a main body removed.
Figure 11:
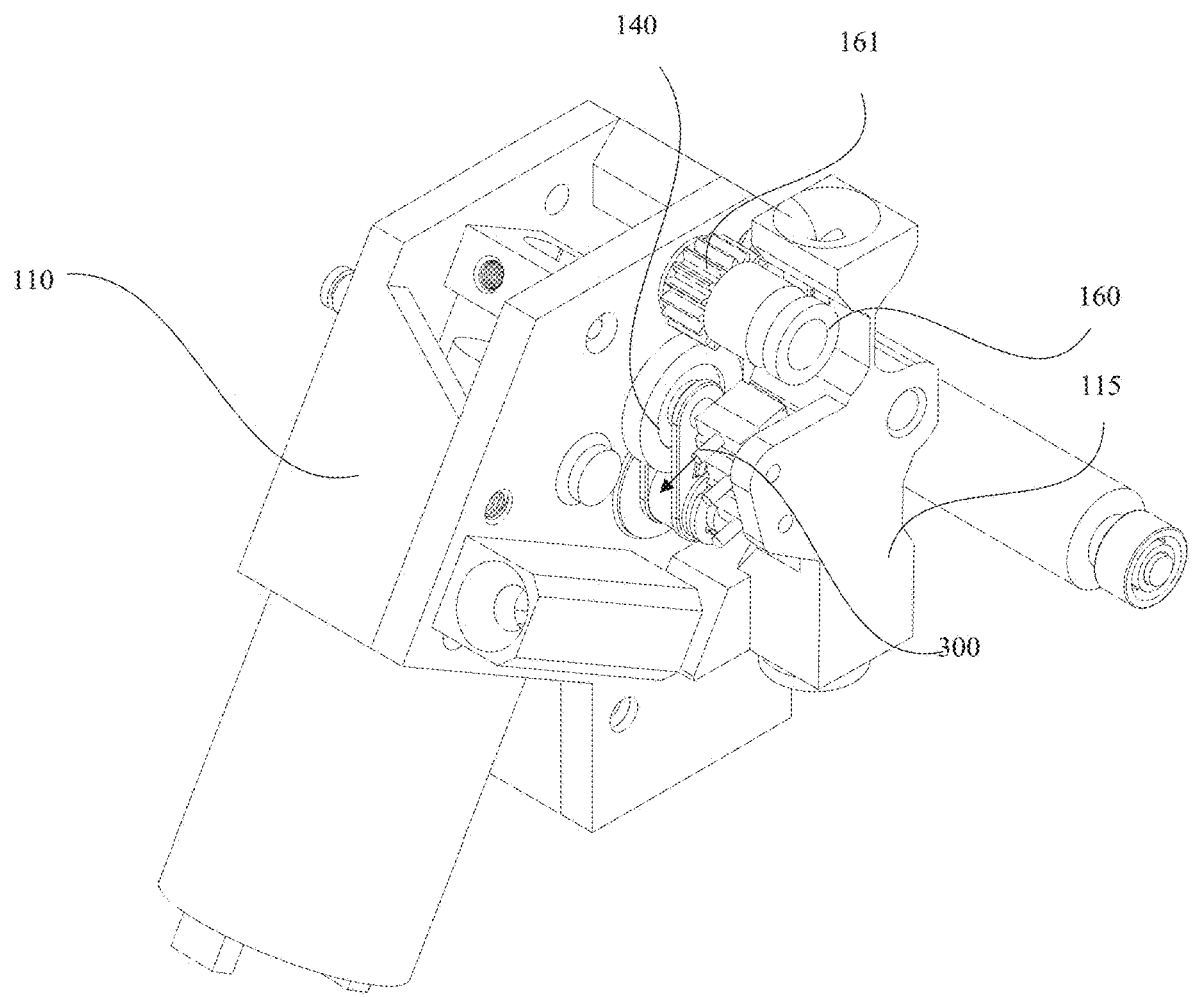
FIG. 11 is an axonometric view of the material feeding mechanism in FIG. 4 at a second angle.
Figure 12:
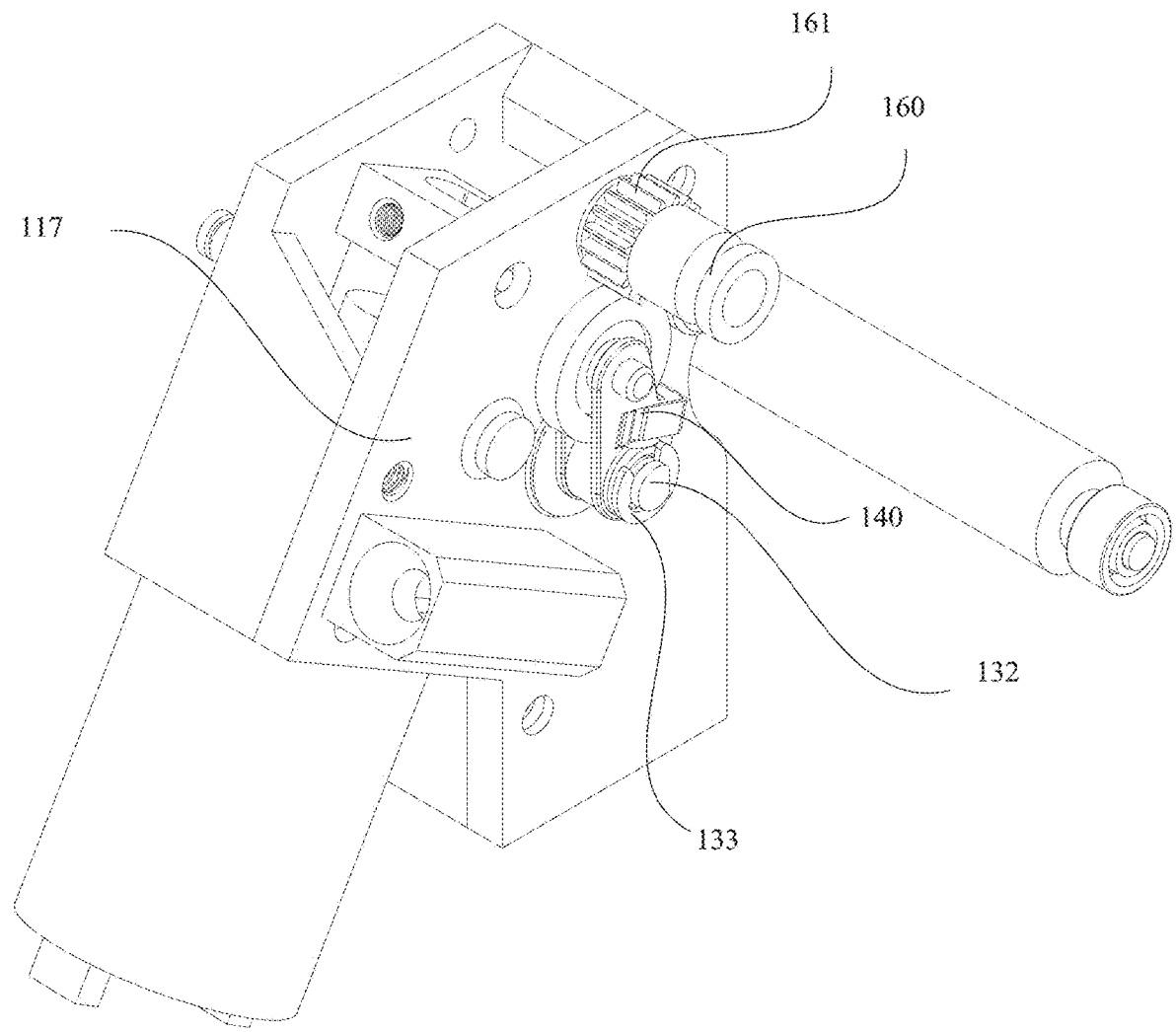
FIG. 12 is a schematic structural diagram of the material feeding mechanism of FIG. 11 with a wire supporting frame removed.
Figure 13:
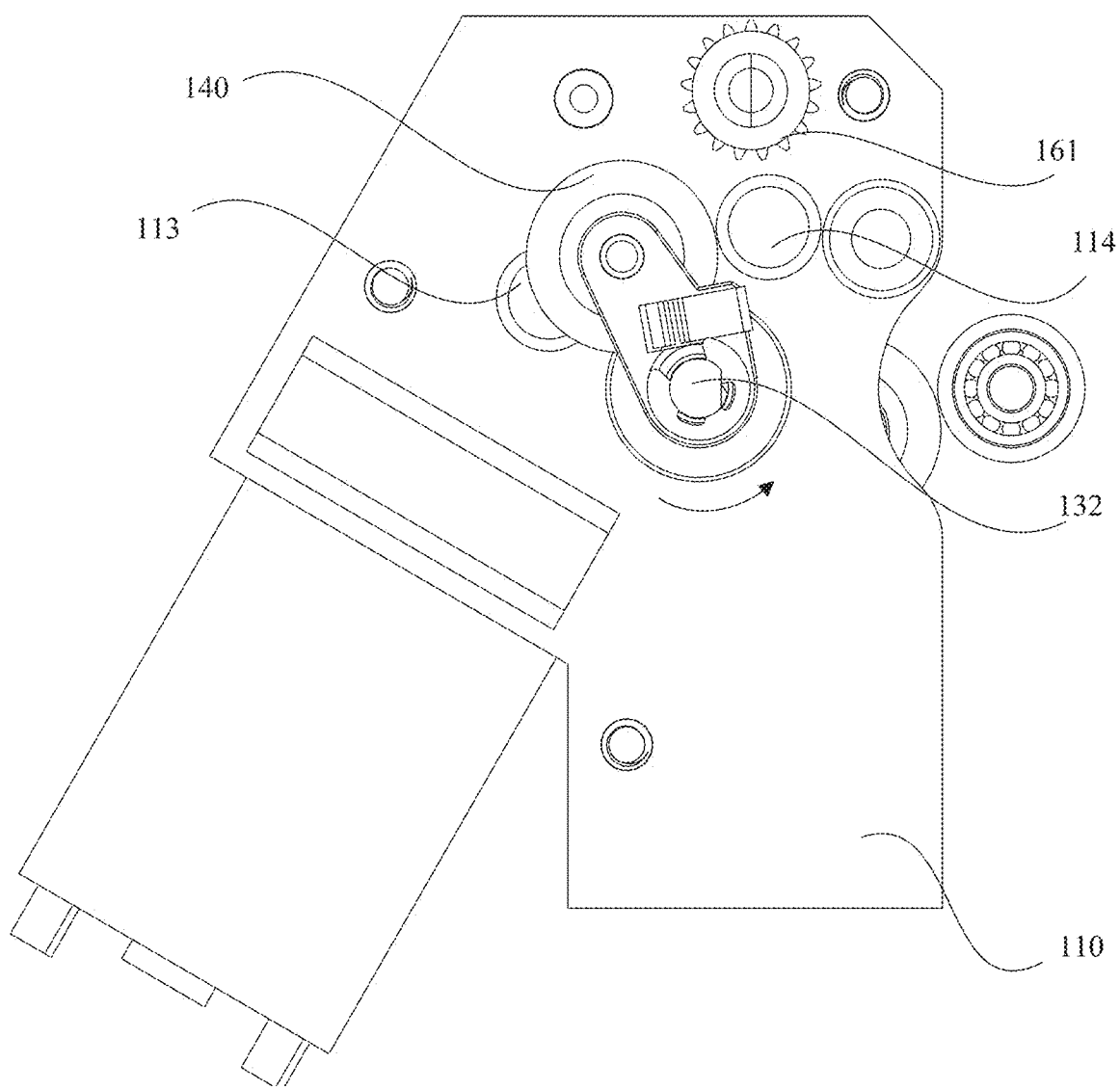
FIG. 13 is a schematic structural diagram of a loading clutch assembly in the material feeding mechanism of FIG. 12 in a third position according to some embodiments of the present disclosure.
Figure 14:
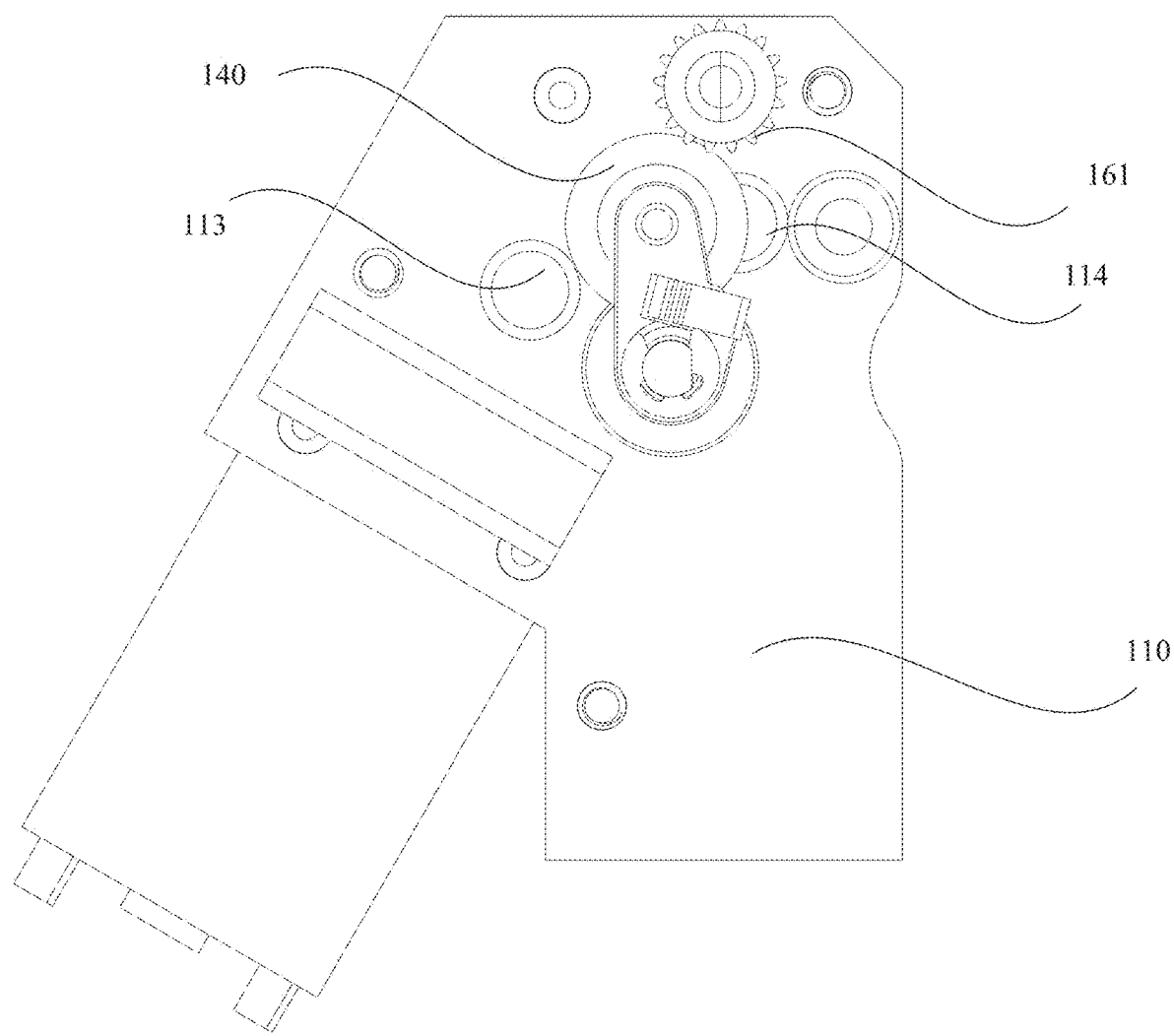
FIG. 14 is a schematic structural diagram of the loading clutch assembly in the material feeding mechanism of FIG. 12 in a fourth position according to some embodiments of the present disclosure.

FIG. 10 is a schematic structural diagram of the material feeding mechanism of FIG. 5 with the main body 110 removed; FIG. 11 is an axonometric view of the material feeding mechanism 100 in FIG. 4 at a second angle; FIG. 12 is a schematic structural diagram of the material feeding mechanism of FIG. 11 with a wire supporting frame removed; FIG. 13 is a schematic structural diagram of a loading clutch assembly 140 in the material feeding mechanism of FIG. 12 in a third position; and FIG. 14 is a schematic structural diagram of the loading clutch assembly 140 in the material feeding mechanism of FIG. 12 in a fourth position. The arrow direction in FIG. 13 is the first direction.

Referring to FIGS. 10 to 14, in some embodiments, the material feeding mechanism 100 further comprises a loading clutch assembly 140. The loading clutch assembly 140 is connected to the main body 110. The loading clutch assembly 140 may be switchable between a third position relative to the main body 110 (the position as shown in FIG. 13) and a fourth position relative to the main body 110 (the position as shown in FIG. 14) under driving of the driver assembly 130.

When the loading clutch assembly 140 is in the third position, the loading clutch assembly 140 may be drivingly separated from a wire 300, that is, the driving force of the driver assembly 130 cannot be transferred to the wire 300.

When the loading clutch assembly 140 is in the fourth position, the loading clutch assembly 140 is drivingly coupled to the wire 300, and the loading clutch assembly 140 may transfer the driving force output by the driver assembly 130 to the wire 300, so as to pull the wire 300 to be released from the reel 200 under driving of the driver assembly 130.

In an example, the main body 100 may be provided with a wire supporting frame 115. The wire 300 is wound around the reel 200, and the end of the wire 300 may extend out of the reel 200 and be located on the wire supporting frame 115. To fully illustrate the structure of the material feeding mechanism 100, the wire wound around the reel 200 is not shown in the drawings.

When the 3D printer needs to print a three-dimensional object, the driver assembly 130 drives the loading clutch assembly 140 to move to the fourth position relative to the main body 110, and the loading clutch assembly 140 is drivingly coupled to the wire 300, so that the wire 300 can be pulled, so as to deliver the wire 300 into the material guide tube.

The driver assembly 130 may then, for example, drive the loading clutch assembly 140 to move to the third position relative to the main body 110, and the loading clutch assembly 140 is drivingly separated from the wire 300. In this way, the printing motor of the 3D printer may pull the wire 300 in the material guide tube and implement the printing operation. The driver assembly 130 is not required to provide a driving force in this process, so that energy can be saved. Furthermore, since the loading clutch assembly 140 is drivingly separated from the wire 300, it is possible to prevent the driving force of pulling the wire 300 by the printing motor from being transferred to the driver assembly 130, thereby reducing the load of the printing motor. Moreover, the driver assembly 130 is not driven by the wire 300 during the printing operation, reducing unnecessary abrasion.

The loading clutch assembly 140 may be driven in various manners. For example, the driver assembly 130 may comprise a first motor for driving the loading clutch assembly 140 to move between the third position and the fourth position, and a second motor for driving the unloading clutch assembly 120 to move between the first position and the second position.

In another embodiments, the loading clutch assembly 140 and the unloading clutch assembly 120 may be driven by using the same driving motor 131. The unloading clutch assembly 120 and the loading clutch assembly 140 are sleeved at two ends of the transmission shaft 132 respectively, and the output shaft of the driving motor 131 is drivingly coupled to a portion of the transmission shaft 132 between the unloading clutch assembly 120 and the loading clutch assembly 140.

In an embodiment, the main body 110 may have a first wall surface 116 (FIG. 5) and a second wall surface 117 (FIG. 12) which are arranged opposite each other. The driving motor 131 may be arranged between the first wall surface 116 and the second wall surface 117, and the transmission shaft 132 may penetrate through both the first wall surface 116 and the second wall surface 117. As shown in FIG. 10, the output shaft of the driving motor 131 may be coaxially provided with a worm 135, and the portion of the transmission shaft 132 between the first wall surface 116 and the second wall surface 117 may be sleeved with a worm wheel 134. The worm wheel 134 cooperates with the worm 135 so that the direction of a torque output by the driving motor 131 can be changed, simplifying the structure of the material feeding mechanism 100.

Referring to FIG. 5, a first end portion of the transmission shaft 132 extending beyond the first wall surface 116 may be connected to the unloading clutch assembly 120. Referring to FIG. 12, a second end portion of the transmission shaft 132 extending beyond the second wall surface 117 may be connected to the loading clutch assembly 140. To prevent the unloading clutch assembly 120 and the loading clutch assembly 140 from displacing in the axial direction of the transmission shaft 132, catches 133 may also be provided on the transmission shaft 132. The side of the loading clutch assembly 140 facing away from the main body 110 is provided with a catch 133, and the side of the unloading clutch assembly 120 facing away from the main body 110 may also be provided with a catch 133.

Referring to FIG. 10, in some embodiments, the material feeding mechanism 100 further comprises a loading friction wheel 160 rotatably connected to the main body 110. The loading friction wheel 160 has a wheel surface for force fit connection with the wire 300. When the loading clutch assembly 140 is in the third position, the loading clutch assembly 140 is drivingly separated from the loading friction wheel 160 so that the loading clutch assembly 140 is drivingly separated from the wire 300, and when the loading clutch assembly 140 is in the fourth position, the loading clutch assembly 140 is drivingly coupled to the loading friction wheel 160 to pull the wire 300 through the loading friction wheel 160.

Referring to FIG. 11, the loading friction wheel 160 may be of a wheel-like structure, the wheel surface of which may be provided with knurls or other structures. The wheel surface of the loading friction wheel 160 may be configured to come into contact with the wire 300, thereby driving the wire 300 to move in a tangential direction of the loading friction wheel 160. In an example, the wire 300 may be located between the wheel surface of the loading friction wheel 160 and the wire supporting frame 115, and the loading friction wheel 160 may drive the wire 300 to slide along a surface of the wire supporting frame 115. In another example, the main body 110 may be provided with a rotatable driven friction wheel, and the wire 300 may be located between the wheel surface of the loading friction wheel 160 and a wheel surface of the driven friction wheel. When the loading friction wheel 160 rotates, the driven friction wheel rotates with the loading friction wheel 160 to pull the wire 300, such that the friction force between the wire 300 and each of the loading friction wheel 160 and the driven friction wheel is rolling friction force, and the wire 300 is more easily pulled.

When the loading clutch assembly 140 is in the fourth position, the loading clutch assembly 140 may be drivingly coupled to the loading friction wheel 160. The driving force of the driver assembly 130 may be transferred to the loading friction wheel 160 through the loading clutch assembly 140, and transferred to the wire 300 through the loading friction wheel 160, so as to drive the wire 300 to move. Since the wheel surface of the loading friction wheel 160 is provided with the knurls, the static friction force between the wheel surface and the wire 300 can be increased, so that the wire 300 can be effectively driven to move. This solution is simple in structure and easy to implement, and reduces the production cost.

There are various implementations of the loading clutch assembly 140. In some embodiments, the loading clutch assembly 140 is structurally the same as the unloading clutch assembly 120, the functions of the two assemblies differ in that when the loading clutch assembly 140 is in the fourth position, the loading clutch assembly 140 is drivingly coupled to the wire 300, whereas when the unloading clutch assembly 120 is in the first position, the unloading clutch assembly 120 is drivingly coupled to the reel 200. That is, the structures to which the unloading clutch assembly 120 and the loading clutch assembly 140 are drivingly coupled are different.

For example, the loading clutch assembly 140 may also comprise a first connecting member, a first gear, and a second gear. The first connecting member comprises a first end sleeved on the transmission shaft 132 and a second end opposite to the first end. The first gear is sleeved on the transmission shaft 132 and is in form-fit connection to the transmission shaft 132. The second gear is rotatably connected to the second end of the first connecting member and is meshed with the first gear. The first connecting member abuts against the first gear so that the first connecting member and the second gear can be circumferentially pivoted around the transmission shaft 132 with the rotation of the transmission shaft 132 and the first gear.

In an example, the loading clutch assembly 140 further comprises a second connecting member arranged opposite to the first connecting member with respect to the first gear and the second gear.

In an example, the loading clutch assembly 140 further comprises an elastic clamp member for bridging the first connecting member and the second connecting member to provide an elastic force enabling the first connecting member and the second connecting member to clamp the first gear.

As an example implementation of the elastic clamp member of the loading clutch assembly 140, the elastic clamp member comprises an elastic clamp member body axially extending parallel to the transmission shaft 132 and two clamping jaws connected to two ends of the elastic clamp member body respectively. A first clamping jaw of the two clamping jaws abuts against an outer surface of the first connecting member facing away from the first gear and the second gear, and a second clamping jaw of the two clamping jaws abuts against an outer surface of the second connecting member facing away from the first gear and the second gear.

Further, in the loading clutch assembly 140, the outer surface of the first connecting member may be provided with a first groove, and the outer surface of the second connecting member may be provided with a second groove. The first clamping jaw is provided with a first protrusion engaged with the first groove, and the second clamping jaw is provided with a second protrusion engaged with the second groove.

The first connecting member, the first gear, the second gear, the elastic clamp member and the second connecting member in the loading clutch assembly 140 are identical in structure and function to the first connecting member 121, the first gear 122, the second gear 123, the elastic clamp member 125 and the second connecting member 124 in the unloading clutch assembly 120, and reference can be made specifically to the above description of the unloading clutch assembly 120, which will not be described in detail herein again.

In some embodiments, to allow the second gear of the loading clutch assembly 140 to drive the loading friction wheel 160 to rotate, the loading friction wheel 160 may comprise a third wheel body and a fourth wheel body. The third wheel body and the fourth wheel body may be integrally machined and formed. The third wheel body has a wheel surface provided with knurls, and the fourth wheel body may have a plurality of teeth arranged in a circumferential direction. The fourth wheel body may be configured to mesh with the second gear 123.

In other embodiments, the material feeding mechanism 100 may comprise a second mating gear 161. The second mating gear 161 is coaxially connected to the loading friction wheel 160, as shown in FIG. 11. For example, the main body 110 may be provided with a rotatable loading rotary shaft, and the second mating gear 161 and the loading friction wheel 160 may be both in form-fit connection to the loading rotary shaft, so that the machining of the loading friction wheel 160 can be simplified, and the cost can be reduced.

The second mating gear 161 is configured such that when the loading clutch assembly 140 is in the third position, the second mating gear 161 is disengaged from the second gear of the loading clutch assembly 140, and when the loading clutch assembly 140 is in the fourth position, the second mating gear 161 is meshed with the second gear of the loading clutch assembly 140, and the second gear can drive the second mating gear 161 to rotate, thereby driving the loading friction wheel 160 to rotate.

Referring to FIG. 14, when the 3D printer needs to print a three-dimensional object, the driving motor 131 drives the transmission shaft 132 to rotate in a second direction (the direction opposite to the arrow direction in FIG. 13) so as to drive the first connecting member, the first gear and the second gear of the loading clutch assembly 140 to rotate as a whole relative to the main body 110, so that the second gear can swing to a position where it can be meshed with the second mating gear 161, that is, the loading clutch assembly 140 is in the fourth position. Since the second mating gear 161 is meshed with the second gear, when the driving motor 131 continues to drive the transmission shaft 132 to rotate in the second direction, the second mating gear 161 provides a resistance against the rotation of the second gear and the first connecting member in the circumferential direction of the transmission shaft 132. The resistance can overcome a frictional force between the first connecting member and the first gear, so that relative rotation occurs between the first gear and the first connecting member. That is, the first gear may continue to rotate with the transmission shaft 132, while the first connecting member may remain stationary relative to the main body 110. Since the first gear is meshed with the second gear, the first gear may drive the second gear to rotate relative to the first connecting member, while the second gear may drive the second mating gear 161 to rotate, thereby driving the loading friction wheel 160 to rotate so as to pull the wire 300 to move in a direction from right to left in FIG. 14 (that is, in FIG. 11, the wire 300 moves in the arrow direction), so as to deliver the wire 300 into the material guide tube. After the wire 300 is delivered to the material guide tube, the driving motor 131 may, for example, drive the transmission shaft 132 to rotate in the first direction (the arrow direction in FIG. 13), the second gear of the loading clutch assembly 140 may be disengaged from the second mating gear 161, and the loading clutch assembly 140 is in the third position (as shown in FIG. 13). In this way, the printing motor of the 3D printer can continue to pull the wire in the material guide tube to implement the printing operation.

In some embodiments, the unloading clutch assembly 120 and the loading clutch assembly 140 are configured such that when the unloading clutch assembly 120 is in the first position, the loading clutch assembly 140 is in the third position, and when the unloading clutch assembly 120 is in the second position, the loading clutch assembly 140 is in the fourth position.

In an unloading operation, when the unloading clutch assembly 120 is in the position shown in FIG. 6, the loading clutch assembly 140 is in the position shown in FIG. 13. In a loading operation, when the unloading clutch assembly 120 is in the position shown in FIG. 7, the loading clutch assembly 140 is in the position shown in FIG. 14.

When the 3D printer completes printing or wire replacement is required, the driver assembly 130 drives the unloading clutch assembly 120 to be drivingly coupled to the unloading friction wheel 150 and drives the loading clutch assembly 140 to be drivingly separated from the loading friction wheel 160. The unloading friction wheel 150 may drive the reel 200 to rotate reversely, thereby winding the wire around the reel 200. During this process, the loading clutch assembly 140 is drivingly separated from the loading friction wheel 160, and the loading clutch assembly 140 does not hinder the reverse rotation of the reel 200.

When the 3D printer needs to print a three-dimensional object, the driver assembly 130 drives the loading clutch assembly 140 to be drivingly coupled to the loading friction wheel 160 and drives the unloading clutch assembly 120 to be drivingly separated from the unloading friction wheel 150. The loading friction wheel 160 may pull the wire 300 into the material guide tube. In this process, the reel 200 rotates forward relative to the reel holder 400, and the unloading clutch assembly 120 does not hinder the forward rotation of the reel 200.

It may be appreciated that in some embodiments the driver assembly 130 may be implemented by arranging a first motor and a second motor to drive the loading clutch assembly 140 and the unloading clutch assembly 120 respectively, and in some embodiments it may be implemented through the driving motor 131 and the transmission shaft 132.

In an example, the unloading clutch assembly 120 and the loading clutch assembly 140 are sleeved on the transmission shaft 132 such that the unloading clutch assembly 120 and the loading clutch assembly 140 can be circumferentially pivoted around the transmission shaft 132 with the rotation of the transmission shaft 132. The unloading clutch assembly 120 and the loading clutch assembly 140 are at an angle to each other in the circumferential direction of the transmission shaft 132 such that when the unloading clutch assembly 120 is circumferentially pivoted around the transmission shaft 132 in the first direction to the first position, the loading clutch assembly 140 is pivoted in the first direction to the third position, and when the unloading clutch assembly 120 is circumferentially pivoted around the transmission shaft 132 in a second direction opposite to the first direction to the second position, the loading clutch assembly 140 is pivoted in the second direction to the fourth position. Therefore, one driving motor 131 may be provided, simplifying the structure of the material feeding mechanism 100.

In some embodiments, the main body 110 of the material feeding mechanism 100 is further provided with a third position limiter 113 and a fourth position limiter 114. The loading clutch assembly 140 is movable between the third position limiter 113 and the fourth position limiter 114.

The third position limiter 113 and the fourth position limiter 114 may be both configured to protrude from the main body 110, and reference for the specific implementation may be made to the structure of the first position limiter 111. In an example, the first position limiter 111 and the second position limiter 112 protrude from the first wall surface 116 of the main body 110, and the third position limiter 113 and the fourth position limiter 114 protrude from the second wall surface 117 of the main body 110.

The third position limiter 113 is positioned on a movement path of the loading clutch assembly 140 relative to the main body 110 such that the loading clutch assembly 140 is in the third position when moved to abut against the third position limiter 113. The fourth position limiter 114 is positioned on a movement path of the loading clutch assembly 140 relative to the main body 110 such that the loading clutch assembly 140 is in the fourth position when moved to abut against the fourth position limiter 114. Referring to FIG. 13, the third position limiter 113 is arranged with respect to the second end (the smaller one of the two ends of the second connecting member) of the second connecting member (the one of the two connecting members of the loading clutch assembly 140 that is closer to the main body 110) of the loading clutch assembly 140 such that when the loading clutch assembly 140 is in the third position, a left edge of the second end of the second connecting member may abut against the third position limiter 113. The fourth position limiter 114 is arranged opposite to the third position limiter 113 with respect to the second end of the second connecting member of the loading clutch assembly 140 such that when the loading clutch assembly 140 is in the fourth position, a right edge of the second end of the second connecting member may abut against the third position limiter 113. The spatially relative terms "left" and "right" herein are used with reference to FIGS. 13 and 14 and should not be construed as being limiting.

An example will be taken for description below in which the reverse rotation of the driving motor 131 drives the transmission shaft 132 to rotate in the first direction, and the forward rotation of the driving motor 131 drives the transmission shaft 132 to rotate in the second direction. Referring to FIGS. 6 and 13, when the driving motor 131 reversely drives the unloading clutch assembly 120 to be drivingly coupled to the unloading friction wheel 150, the unloading clutch assembly 120 may abut against the first position limiter 111, and the loading clutch assembly 140 may abut against the third position limiter 113. When the driving motor 131 continues to reversely rotate to drive the reel 200 to reversely rotate, the transmission shaft 132 continues to rotate in the first direction, and the third position limiter 113 can provide a resistance against the frictional force between the first connecting member and the first gear of the loading clutch assembly 140, so that the loading clutch assembly 140 remains in the third position. This can shorten the movement path of the loading clutch assembly 140 and reduce the useless movement of the loading clutch assembly 140.

Referring to FIG. 14, when the driving motor 131 rotates forward to drive the loading clutch assembly 140 to be drivingly coupled to the loading friction wheel 160, the loading clutch assembly 140 may abut against the fourth position limiter 114, and the unloading clutch assembly 120 may abut against the second position limiter 112. When the driving motor 131 continues to rotate forward, the fourth position limiter 114 may provide a resistance against the frictional force between the first connecting member and the first gear of the loading clutch assembly 140 so that the loading clutch assembly 140 may remain in the fourth position and pull the wire 300 through the loading friction wheel 160. By arranging the fourth position limiter 114, a contact force between the second gear and the second mating gear 161 can be reduced, the abrasion of the two gears can be reduced, and the service life of the loading clutch assembly 140 can be prolonged. In addition, the second position limiter 112 may provide the resistance against the frictional force between the first connecting member 121 and the first gear 122 of the unloading clutch assembly 120 so that the unloading clutch assembly 120 may remain in the second position.

The specific limiting way of the third position limiter 113 and the fourth position limiter 114 may refer to the above description of the first position limiter 111 and the second position limiter 112 and is not described in detail herein again.

An embodiment of the present disclosure further provides a multi-material unit, comprising at least one reel 200 and at least one material feeding mechanism 100. At least one wire 300 for a 3D printer is respectively wound around the at least one reel 200. The at least one material feeding mechanism 100 is for use with respective ones of the at least one reel 200 to feed at least one wire 300 to the 3D printer.

It may be appreciated that the multi-material unit may comprise a case and at least one (one or more) material feeding module(s) arranged in the case, and that each material feeding module may be provided with one reel 200 and one material feeding mechanism 100. That is, the material feeding mechanisms 100 and the reels 200 in the multi-material unit have a one-to-one correspondence in number, and one reel 200 may be wound with one type of wire 300 and provided with one material feeding mechanism 100. In an example, each reel 200 may be further provided with one reel holder 400. In addition, one material guide tube for guiding the wire toward the hot end of the 3D printer may penetrate the case of the multi-material unit, that is, a plurality of material feeding units may share one material guide tube.

The structure and function of the material feeding mechanism 100 are the same as those of the above embodiment, and are not described in detail herein again.

An embodiment of the present disclosure further provides a 3D printing system, comprising a 3D printer and a multi-material unit. The multi-material unit is configured to feed a wire 300 to the 3D printer. The 3D printer has a hot end and a printing motor, and the printing motor may be configured to pull the wire 300 in a material guide tube and deliver it to the hot end during printing. The hot end may heat and melt the wire 300, and the 3D printer can build a three-dimensional object with a building material layer by layer, which is formed after the wire is molten.

As described above, the multi-material unit may comprise at least one reel 200 and at least one material feeding mechanism 100. At least one wire 300 for a 3D printer is respectively wound around the at least one reel 200. The at least one material feeding mechanism 100 is for use with respective ones 200 of the at least one reel 200 to feed at least one wire 300 to the 3D printer.

As described above, each material feeding mechanism 100 comprises a main body 110, an unloading clutch assembly 120 connected to the main body 110, and a driver assembly 130. The driver assembly 130 is configured to drive the unloading clutch assembly 120 to be switchable between a first position relative to the main body 110 in which the unloading clutch assembly 120 is drivingly coupled to a corresponding reel 200 of the at least one reel 200 to rotate the corresponding reel 200 under driving of the driver assembly 130 to wind the corresponding wire 300 of the at least one wire 300 around the corresponding reel 200; and a second position relative to the main body 110 in which the unloading clutch assembly 120 is drivingly separated from the corresponding reel 200.

In some embodiments, each material feeding mechanism 100 further comprises a loading clutch assembly 140 connected to the main body 110. The driver assembly 130 is further configured to drive the loading clutch assembly 140 to be switchable between a third position relative to the main body 110 in which the loading clutch assembly 140 is drivingly separated from the corresponding wire 300, and a fourth position relative to the main body 110 in which the loading clutch assembly 140 is drivingly coupled to the corresponding wire 300 to pull the corresponding wire 300 to be released from the corresponding reel 200 under driving of the driver assembly 130.

The specific structure and function of the multi-material unit and the material feeding mechanism 100 may refer to the above embodiments and are not described in detail herein again.

In some embodiments, in each material feeding mechanism 100 of the multi-material unit of the 3D printing system, the driver assembly 130 may also be configured to execute the following operations.

When the material feeding mechanism 100 is operated for unloading, the driver assembly 130 drives the unloading clutch assembly 120 to move to the first position and drives the loading clutch assembly 140 to move to the third position.

The "unloading" may occur when printing is completed or wire replacement is required, which may be understood as a process in which the wire 300 needs to be withdrawn from the material guide tube and rewound around the reel 200. During unloading, the driver assembly 130 drives the unloading clutch assembly 120 to be drivingly coupled to the unloading friction wheel 150, and drives the loading clutch assembly 140 to be drivingly separated from the loading friction wheel 160. The unloading friction wheel 150 may drive the reel 200 to rotate reversely, thereby winding the wire around the reel 200. During this process, the loading clutch assembly 140 is drivingly separated from the loading friction wheel 160, and the loading clutch assembly 140 does not hinder the reverse rotation of the reel 200.

When the material feeding mechanism 100 is operated for loading, the driver assembly 130 drives the unloading clutch assembly 120 to move to the second position and drives the unloading clutch assembly 140 to move to the fourth position.

The "loading" may be understood as a process in which the multi-material unit delivers the wire 300 required for printing to the material guide tube. During loading, the driver assembly 130 drives the loading clutch assembly 140 to be drivingly coupled to the loading friction wheel 160, and drives the unloading clutch assembly 120 to be drivingly separated from the unloading friction wheel 150. The loading friction wheel 160 may pull the wire 300 into the material guide tube, and during the process of pulling the wire 300, the reel 200 rotates forward relative to the reel holder 400, and the unloading clutch assembly 120 does not hinder the forward rotation of the reel 200.

When the material feeding mechanism 100 has been operated for loading to allow the 3D printer to perform printing, the driver assembly 130 keeps the unloading clutch assembly 120 in the second position, keeps the loading clutch assembly 140 in the fourth position, and turns off the driver assembly 130.

The "printing" may be understood as a process in which the printing motor in the 3D printer pulls the wire 300 in the material guide tube and delivers it to the hot end of the 3D printer. During printing, the driver assembly 130 may drive the loading clutch assembly 140 to be drivingly coupled to the loading friction wheel 160 and drive the unloading clutch assembly 120 to be drivingly separated from the unloading friction wheel 150, and then stop the driver assembly 130, for example, a power supply of the driving motor 131 may be turned off. Referring to FIGS. 11 and 14, by the driving of the printing motor, the wire 300 may continue to move in the arrow direction in FIG. 11 (the direction from right to left in FIG. 14), and the driving force applied to the wire 300 by the printing motor may simultaneously drive the loading friction wheel 160 to rotate in a clockwise direction in FIG. 14 and then drive the coaxial second mating gear 161 to rotate in the clockwise direction in FIG. 14. The second mating gear 161 may apply to the second gear of the loading clutch assembly 140 a driving force for rotation in a counterclockwise direction relative to the transmission shaft 132, thereby pushing away the second gear, so that the loading clutch assembly 140 is drivingly separated from the second mating gear 161, and the loading clutch assembly 140 may be located between the third position and the fourth position. Since the driver assembly 130 has stopped operating, the transmission shaft 132 does not rotate and the unloading clutch assembly 120 may remain in the second position. The 3D printer can continue to execute the printing operation, and neither the loading clutch assembly 140 nor the unloading clutch assembly 120 affects the normal operation of the printing motor.

It may be appreciated that during printing, the loading clutch assembly 140 may be located between the third position defined by the third position limiter 113 and the fourth position defined by the fourth position limiter 114 after being pushed away. When the 3D printing system resumes unloading, the loading clutch assembly 140 may rotate in the first direction along with the transmission shaft 132 and be brought into the third position, and at this time, the unloading clutch assembly 120 moves from the second position to a position between the first position and the second position. When the transmission shaft 132 continues to rotate in the first direction, the unloading clutch assembly 120 may re-abut against the first position limiter 111, that is, the unloading clutch assembly 120 is in the first position. The transmission shaft 132 continues to rotate in the first direction and drives the reel 200 to rotate reversely through the unloading clutch assembly 120 to wind the wire 300 around the reel 200.

Similarly, when the 3D printing system resumes loading, the loading clutch assembly 140 may rotate in the second direction along with the transmission shaft 132 and be brought into the fourth position. At this time, the unloading clutch assembly 120 may be located between the first position and the second position. When the transmission shaft 132 continues to rotate in the second direction to pull the wire 300 for loading, the unloading clutch assembly 120 may re-abut against the second position limiter 112, that is, in the second position.

In some embodiments, during the printing operation, the unloading clutch assembly 120 may also be located between the first position and the second position and the loading clutch assembly 140 may be located between the third position and the fourth position by adjusting a rotation angle of the driving motor 131. The specific angle may be set according to the actual situation.

According to the multi-material unit and the 3D printing system provided by the embodiments of the present disclosure, the unloading clutch assembly 120 and the driver assembly are arranged on the main body 110 of the material feeding mechanism 100, such that the driver assembly 130 can drive the unloading clutch assembly 120 to be switched between the first position relative to the main body 110 and the second position relative to the main body 110. In the first position, the unloading clutch assembly 120 is drivingly coupled to the reel 200 and can rotate the reel 200 under driving of the driver assembly 130 to wind the wire 300 around the reel 200, thereby preventing the wire 300 from being suspended or accumulated in the material feeding mechanism 100 after unloading, and improving the reliability and tidiness of the multi-material unit. In the second position, the unloading clutch assembly 120 is drivingly separated from the reel 200, and the 3D printing system can normally print a three-dimensional object.

Although the present disclosure has been illustrated and described in detail in the drawings and the foregoing description, such illustration and description should be considered illustrative and schematic, rather than limiting; and the present disclosure is not limited to the disclosed embodiments. By studying the drawings, the disclosure, and the appended claims, those skilled in the art can understand and implement modifications to the disclosed embodiments when practicing the claimed subject matter. In the claims, the word "comprising" does not exclude other elements or steps not listed, the indefinite article "a" or "an" does not exclude plural, and the term "a plurality of" means two or more. The mere fact that certain measures are recited in mutually different dependent claims does not indicate that a combination of these measures cannot be used to get benefit.

LIST OF REFERENCE NUMERALS

100: Material feeding mechanism;
111: First position limiter;
112: Second position limiter;
113: Third position limiter;
114: Fourth position limiter;
115: Wire supporting frame;
116: First wall surface;
117: Second wall surface;
120: Unloading clutch assembly;
121: First connecting member;
1211: First groove;
1212: First end;
1213: Second end;
122: First gear;
123: Second gear;
124: Second connecting member;
1241: Second groove;
125: Elastic clamp member;
1251: Elastic clamp member body;
1252: First clamping jaw;
1252a: First protrusion;
1253: Second clamping jaw;
1253a: Second protrusion;
130: Driver assembly;
131: Driving motor;
132: Transmission shaft;
133: Catch;
134: Worm wheel;
135: Worm;
140: Loading clutch assembly;
150: Unloading friction wheel;
151: First mating gear;
160: Loading friction wheel;
161: Second mating gear;
200: Reel;
210: Flange;
300: Wire;
400: Reel holder.

What is claimed is:

1. A material feeding mechanism, comprising:
a main body;
an unloading clutch assembly connected to the main body;
a driver assembly configured to drive the unloading clutch assembly to be switchable between (i) a first position relative to the main body in which the unloading clutch assembly is drivingly coupled to a reel to rotate the reel under driving of the driver assembly to wind a wire around the reel; and (ii) a second position relative to the main body in which the unloading clutch assembly is drivingly separated from the reel; and
a loading clutch assembly connected to the main body,
wherein the driver assembly is further configured to drive the loading clutch assembly to be switchable between (i) a third position relative to the main body in which the loading clutch assembly is drivingly separated from the wire; and (ii) a fourth position relative to the main body in which the loading clutch assembly is drivingly coupled to the wire to pull the wire to be released from the reel under driving of the driver assembly.

2. The material feeding mechanism according to claim 1, further comprising:
an unloading friction wheel rotatably connected to the main body, the unloading friction wheel having a wheel surface for force fit connection with a flange of the reel,
wherein the unloading clutch assembly and the unloading friction wheel are configured such that when the unloading clutch assembly is in the first position, the unloading clutch assembly is drivingly coupled to the unloading friction wheel to rotate the reel through the unloading friction wheel, and when the unloading clutch assembly is in the second position, the unloading clutch assembly is drivingly separated from the unloading friction wheel to drivingly separate the unloading clutch assembly from the reel.

3. The material feeding mechanism according to claim 2, further comprising:
a loading friction wheel rotatably connected to the main body, the loading friction wheel having a wheel surface for force fit connection with the wire,
wherein the loading clutch assembly and the loading friction wheel are configured such that when the loading clutch assembly is in the third position, the loading clutch assembly is drivingly separated from the loading friction wheel to drivingly separate the loading clutch assembly from the wire, and when the loading clutch assembly is in the fourth position, the loading clutch assembly is drivingly coupled to the loading friction wheel to pull the wire through the loading friction wheel.

4. The material feeding mechanism according to claim 3, wherein the unloading clutch assembly and the loading clutch assembly are configured such that when the unloading clutch assembly is in the first position, the loading clutch assembly is in the third position, and when the unloading clutch assembly is in the second position, the loading clutch assembly is in the fourth position.

5. The material feeding mechanism according to claim 4,
wherein the driver assembly comprises a driving motor connected to the main body and a transmission shaft drivingly coupled to an output shaft of the driving motor,
wherein the unloading clutch assembly and the loading clutch assembly are sleeved on the transmission shaft such that the unloading clutch assembly and the loading clutch assembly are circumferentially pivotable around the transmission shaft with the rotation of the transmission shaft, and
wherein the unloading clutch assembly and the loading clutch assembly are at an angle to each other in the circumferential direction of the transmission shaft so that when the unloading clutch assembly is circumferentially pivoted around the transmission shaft in a first direction to the first position, the loading clutch assembly is pivoted in the first direction to the third position, and when the unloading clutch assembly is circumferentially pivoted around the transmission shaft in a second direction opposite to the first direction to the second position, the loading clutch assembly is pivoted in the second direction to the fourth position.

6. The material feeding mechanism according to claim 5,
wherein the unloading clutch assembly and the loading clutch assembly are respectively sleeved at two ends of the transmission shaft, and
wherein the output shaft of the driving motor is drivingly coupled to a portion of the transmission shaft between the unloading clutch assembly and the loading clutch assembly.

7. The material feeding mechanism according to claim 5, wherein each of the unloading clutch assembly and the loading clutch assembly comprises:
a first connecting member comprising a first end sleeved on the transmission shaft and a second end opposite to the first end;
a first gear sleeved on the transmission shaft and in form-fit connection to the transmission shaft; and
a second gear rotatably connected to the second end of the first connecting member and meshed with the first gear,
wherein the first connecting member abuts against the first gear so that the first connecting member and the second gear are circumferentially pivotable around the transmission shaft with the rotation of the transmission shaft and the first gear.

8. The material feeding mechanism according to claim 7, further comprising:
a first mating gear coaxially connected to the unloading friction wheel,
wherein the first mating gear is configured such that when the unloading clutch assembly is in the first position, the first mating gear is meshed with the second gear of the unloading clutch assembly, and when the unloading clutch assembly is in the second position, the first mating gear is disengaged from the second gear of the unloading clutch assembly.

9. The material feeding mechanism according to claim 7, further comprising:
a second mating gear coaxially connected to the loading friction wheel,
wherein the second mating gear is configured such that when the loading clutch assembly is in the third position, the second mating gear is disengaged from the second gear of the loading clutch assembly, and when the loading clutch assembly is in the fourth position, the second mating gear is meshed with the second gear of the loading clutch assembly.

10. The material feeding mechanism according to claim 7, wherein each of the unloading clutch assembly and the loading clutch assembly further comprises a second connecting member arranged opposite to the first connecting member with respect to the first gear and the second gear.

11. The material feeding mechanism according to claim 10, wherein each of the unloading clutch assembly and the loading clutch assembly further comprises an elastic clamp member for bridging the first connecting member and the second connecting member to provide an elastic force enabling the first connecting member and the second connecting member to clamp the first gear.

12. The material feeding mechanism according to claim 11, wherein the elastic clamp member comprises:
an elastic clamp member body axially extending parallel to the transmission shaft; and
two clamping jaws connected to two ends of the elastic clamp member body respectively,
wherein a first clamping jaw of the two clamping jaws abuts against an outer surface of the first connecting member facing away from the first gear and the second gear, and a second clamping jaw of the two clamping jaws abuts against an outer surface of the second connecting member facing away from the first gear and the second gear.

13. The material feeding mechanism according to claim 12,
wherein the outer surface of the first connecting member is provided with a first groove,
wherein the outer surface of the second connecting member is provided with a second groove,
wherein the first clamping jaw is provided with a first protrusion engaged with the first groove, and
wherein the second clamping jaw is provided with a second protrusion engaged with the second groove.

14. The material feeding mechanism according to claim 12, wherein the main body is further provided with:
a third position limiter positioned on a movement path of the loading clutch assembly relative to the main body such that the loading clutch assembly is in the third position when moved to abut against the third position limiter; and
a fourth position limiter positioned on the movement path of the loading clutch assembly relative to the main body such that the loading clutch assembly is in the fourth position when moved to abut against the fourth position limiter.

15. The material feeding mechanism according to claim 1, wherein the main body is provided with:
a first position limiter positioned on a movement path of the unloading clutch assembly relative to the main body such that the unloading clutch assembly is in the first position when moved to abut against the first position limiter; and
a second position limiter positioned on the movement path of the unloading clutch assembly relative to the main body such that the unloading clutch assembly is in the second position when moved to abut against the second position limiter.

16. A multi-material unit, comprising:
at least one reel around which at least one wire for a 3D printer is wound respectively; and
at least one material feeding mechanism, each material feeding mechanism comprising the material feeding mechanism according to claim 1,
wherein the at least one material feeding mechanism is for use with respective ones of the at least one reel to feed the at least one wire to the 3D printer.

17. A 3D printing system, comprising:
a 3D printer;
at least one reel around which at least one wire for the 3D printer is wound; and
at least one material feeding mechanism, each material feeding mechanism comprising:
   a main body;
   an unloading clutch assembly connected to the main body;
   a driver assembly configured to drive the unloading clutch assembly to be switchable between (i) a first position relative to the main body in which the unloading clutch assembly is drivingly coupled to a corresponding reel of the at least one reel to rotate the corresponding reel under driving of the driver assembly to wind a corresponding wire of the at least one wire around the corresponding reel; and (ii) a second position relative to the main body in which the unloading clutch assembly is drivingly separated from the corresponding reel; and
   a loading clutch assembly connected to the main body,
   wherein the driver assembly is further configured to drive the loading clutch assembly to be switchable between (i) a third position relative to the main body in which the loading clutch assembly is drivingly separated from the corresponding wire; and (ii) a fourth position relative to the main body in which the loading clutch assembly is drivingly coupled to the corresponding wire to pull the corresponding wire to be released from the corresponding reel under driving of the driver assembly,
wherein the at least one material feeding mechanism is for use with the corresponding reel of the at least one reel to feed the at least one wire to the 3D printer.

18. The 3D printing system according to claim 17, wherein for each material feeding mechanism, the driver assembly is further configured to:
   when the material feeding mechanism is operated for unloading, drive the unloading clutch assembly to move to the first position and the loading clutch assembly to move to the third position;
   when the material feeding mechanism is operated for loading, drive the unloading clutch assembly to move to the second position and the loading clutch assembly to move to the fourth position; and
   when the material feeding mechanism has been operated for loading to allow the 3D printer to perform printing, keep the unloading clutch assembly in the second position and the loading clutch assembly in the fourth position, and turn off the driver assembly.

* * * * *